United States Patent [19]

Blais et al.

[11] Patent Number: 5,355,410
[45] Date of Patent: Oct. 11, 1994

[54] METHOD AND APPARATUS FOR MULTI-TIRE TIME SHARED CATV JAMMING

[75] Inventors: Pierre Blais, Montreal; Michael Rychel, Anjou, both of Canada

[73] Assignee: Electroline Equipment Inc., Montreal, Canada

[21] Appl. No.: 107,572

[22] Filed: Aug. 18, 1993

[51] Int. Cl.⁵ ............................................. H04N 7/167
[52] U.S. Cl. ............................................ 380/20; 380/6; 380/7; 380/5; 380/10
[58] Field of Search ........................ 380/6, 7, 5, 10, 20

[56] References Cited

U.S. PATENT DOCUMENTS

| | | | |
|---|---|---|---|
| 5,142,574 | 8/1992 | West | 380/20 |
| 5,228,082 | 7/1993 | Yanagidaira et al. | 380/20 |
| 5,233,652 | 8/1993 | Huang et al. | 380/7 |
| 5,255,318 | 10/1993 | Gurusami et al. | 380/7 |
| 5,278,908 | 1/1994 | Parikh et al. | 380/7 |

*Primary Examiner*—David C. Cain
*Attorney, Agent, or Firm*—Norman B. Rainer

[57] ABSTRACT

A method and apparatus, for jamming selected channels, in a CATV system, wherein six different pre-determined frequencies ("fx"), are generated at a head end, on a time divisional basis, which head end also generates a synchrinization signal ("sync. sig.") that identifies which fx is being generated, a multiple of receiver ends, each of which receives, at one input all of the TV channels' signals, the fx, the sync. sig., and a subscriber status signal ("SSS") that identifies the channels, if any, that the subscriber is entitled to receive, wherein the receiver end: (A) divides the received signals into: (I) TV channels' signals, SSS, and sync. sig., and (II) fx; (B) generates a local fixed frequency; (C) mixes the local fixed frequency with the fx, thereby creating a jamming signal; (D) decodes the sync. sig.; (E) decodes the SSS, to obtain the subscriber status information; (F) transmittes the TV channels' signals to the subscriber, if the subscriber status information, indicates that subscriber, is entitled to receive at least some or all of the TV channels; and (G) combines the jamming signal, with the TV signals, going to the subscriber, when the created jamming signal, is for a channel, that subscriber is not entitled to receive.

20 Claims, 13 Drawing Sheets

METHOD AND APPARATUS FOR MULTI-TIRE TIME SHARED CATV JAMMING

BACKGROUND OF THE INVENTION

1. Field of the Invention:

The invention relates to CATV systems, and more particularly, to a method and apparatus, for the jamming, in a multi-tiered fashion, and on a time shared basis, of selected channels, to selected subscribers.

2. Description of Related Art:

CATV systems, in which there are a number of channels provided to the subscribers, are well known. Many CATV systems, charge different amounts to their various subscribers, depending on how many of the supplied channels the particular subscriber wants to receive. The basic TV channels (hereinafter, in this disclosure, and the claims, referred to as "BTV channels") generally refers to the channels automatically received when a person subscribes. The extended basic TV channels (hereinafter, in this disclosure, and the claims, referred to as "EBTV channels") generally refers to the channels a subscriber pays an additional fee to receive, on a per channel, or on a per group of channels, basis. CATV systems, offering between fifteen and thirty channels, and sometimes more, are available in many jurisdictions. Some of those channels, are BTV channels, and some are EBTV channels. A result of the large number of channels currently available through CATV systems, is that there are many instances, in which it would be desirable, to have the capability, to be able to selectively jam, up to twenty-four selected channels, to selected subscribers.

The inventors are not aware of any prior art multi-tier systems. The prior art systems, presently known to the inventors, generally consist of generating up to eight different jamming signals, sometimes continuously, and sometimes on a time divisional basis. In some present art systems, each continuously generated jamming signal, is continuously added, to the line, of each subscriber, that is not permitted to view the particular channel it jams. In some present art systems, the continuously generated jamming signals, are added on a time shared bases, to the lines of the subscribers, that are not permitted to view the particular channel being jammed. In some present art systems, the time divisionaly generated jamming signals, are added on a time shared basis, to the subscribers lines, who are not permitted to view the particular channel being jammed.

SUMMARY OF THE INVENTION

Hereinafter, in this disclosure, and in the claims, BTV channels, and EBTV channels, are collectively referred to as the "TOTAL CHANNELS".

The invention teaches a method, for selectively controlling, subscriber access, to the TOTAL CHANNELS, that are being transmitted, over a controlled access medium, which controlled access medium, is also transmitting subscriber status signals ("SSS"s), which were generated from a center, and each of which identifies which receiver end it is intended for, and if that receiver end should output to the subscriber, the TOTAL CHANNELS, and which, if any, of the EBTV channels, that receiver end should jam; which method is characterized, in that it is comprised of the steps of: (i) generating from a head end, one at a time, six different frequencies, each of which frequencies are stable in both amplitude and frequency; (ii) using a timing control means, to cause each of the six different frequencies, to be generated in the desired order, and to send out a synchronization signal ("sync. sig."), that identifies which of the six different frequencies, is being generated; (iii) setting up a multiple of receiver ends, each of which: (a) receives at one input, the TOTAL CHANNELS' TV signals, the SSS, the generated frequency, and the sync. sig.; (b) divides the received signals, into: (1) TOTAL CHANNELS' TV signals, SSS, and sync. sig., and (2) the generated frequency; (c) generates a local fixed frequency, which, each time it is combined, with a different one, of the six different head end generated frequencies, will result in a new frequency, that is suitable for jamming, a different one of the television signals, of the EBTV channels, and therefore, is a jamming signal, hereinafter referred to in general, as, "fj"; (d) mixes the local fixed frequency, with the generated frequency, thereby creating an fj; (e) decodes the sync. sig.; (f) decodes the SSS, to obtain the subscriber status information, indicating whether that subscriber is entitled to receive any of the TOTAL CHANNELS, and which, if any, of the EBTV channels, that subscriber is not entitled to receive; (g) transmits the TOTAL CHANNELS' TV signals, to the subscriber, if the subscriber status information indicates that subscriber is entitled to receive some of the TOTAL CHANNELS; (h) combines the fj, with the TOTAL CHANNELS' TV signals, that are going to the subscriber, when the created fj, is for one of the channels that the subscriber status information, indicates that subscriber is not entitled to receive.

The invention, in addition to the stated method, also teaches an apparatus, for selectively controlling subscriber access, to TOTAL CHANNELS, which are being transmitted over a controlled access medium, which controlled access medium, is also transmitting subscriber status signals ("SSS"s), which were generated from a center, and each of which identifies which receiver end, it is intended for, and if that receiver end, should output to the subscriber, the TOTAL CHANNELS, and which, if any, of the EBTV channels, that receiver end, should jam; said apparatus, taught by the invention, is comprised of: a head-end system; and a multiple of receiver ends. The head end, is comprised of: (i) a timing controller ("TC"); (ii) multiple frequency generating means, that generates, one at a time, six different predetermined frequencies (each of which are hereinafter referred to in general, as, "fx"); (iii) wherein the TC controls the multiple frequency generating means, and generates a synchronization signal ("sync. sig."); and (iv) wherein the sync. sig. identifies which fx is being transmitted by the head-end. The receiver ends, are each comprised of: (v) an input diplexer, that receives the TOTAL CHANNELS' TV signals, the SSS, the fx, and the sync. sig., and which outputs, the TOTAL CHANNELS' TV signals, the SSS, and the sync. sig., at a first output, and which outputs, the fx, at a second output; (vi) a first directional coupler, that receives the signals, from the first output of the input diplexer; (vii) an isolation amplifier, that receives the signals, from the first directional coupler; (viii) a data receiver, that also receives the signals, from the first directional coupler, and extracts the SSS, from the group of signals fed to it, and extracts the sync. sig., from the group of signals fed to it; (ix) a first RF switch, that receives the signals, from the output of the isolation amplifier, and which either transmits, or prevents the transmission, of the signals, to the subscriber; (x) a local oscillator, that generates a pre-determined local fixed frequency, which, each time it is combined, with a different one, of the six different fxs, will result in a new frequency, that is suitable for jamming a different one of the television signals, of the EBTV channels, and therefore, is a jamming signal, hereinafter referred to in general, as, "fxj"; (xi) a mixer, that mixes the predetermined local fixed frequency, with the fx outputted at the second output, of the input diplexer, thereby creating jamming signal fxj; (xii) a second RF switch, to transmit, or prevent the transmission, of fxj, to the subscriber; (xiii) an amplifier, suitable for raising the level of fxj, in order to achieve effective jamming; (xiv) a second directional coupler, that couples the output of the amplifier, with the output of the isolation amplifier, at an intermediate point, between the isolation amplifier, and the first RF switch; (xv) a microprocessor, that receives the extracted SSS, from the data receiver, decodes the SSS, to determine whether or not the subscriber, is authorized to receive the BTV channels, and which, if any, of the EBTV channels, the subscriber is authorized to receive, and if the subscriber is not authorized to receive any TV channels, prevents the first RF switch from closing, and if the subscriber is authorized to receive at least some of the TV channels, prevents the first RF switch from opening; (xvi) a synchronization controller, that receives the sync. sig., from the data receiver, and the extracted SSS, from the microprocessor, and decodes the sync. sig., and decodes the SSS, and causes the second RF switch, to close, whenever the fxj is jamming a TV channel, that the subscriber, is not authorized to receive, thereby transmitting the fxj, to the amplifier, and to the subscriber.

DESCRIPTION OF THE PREFERRED EMBODIMENT

A preferred embodiment, of the method, of the instant invention, for selectively controlling, subscriber access, to the TOTAL CHANNELS, which are being transmitted, over a controlled access medium, which controlled access medium, is also transmitting, a Subscriber Status Signal ("SSS"), for each Subscriber, which SSSs, were generated from a center, and each of which, identifies which receiver end, it is intended for, and if that receiver end, should output to the subscriber, the TOTAL CHANNELS, and which, if any, of the EBTV channels, that receiver end, should jam; which method is characterized, in that it is comprised of, the steps of: (i) generating from a head end, one at a time, at predetermined intervals, six different predetermined frequencies, each of which frequencies, is stable, in both amplitude and frequency, and each of which lasts, for a predetermined duration, preferably 10 microseconds, (each of which six different predetermined frequencies, is hereinafter referred to, in general, as, "pfx"); (ii) using a timing control means, to cause each of the six pfxs, to be generated, in the desired order, and to send out, a synchronization signal ("sync. sig."), that identifies, which of the six different frequencies, is being generated; (iii) at the head end, modulating the SSS, onto the system carrier wave, by means of frequency shift keying, and amplitude modulating, the sync. sig., onto the system carrier wave, and combining, all of the head end generated signals, with the TOTAL CHANNELS' TV signals; (iv) setting up a multiple of receiver ends, each of which: (a) receives at one input, the TOTAL CHANNELS TV signals, the SSS, the pfx, and the sync. sig.; (b) divides the received signals, into: (1) TOTAL CHANNELS' TV signals, SSS, and sync. sig., and (2) the pfx; (c) decodes the sync. sig.; (d) decodes the SSS, to obtain the subscriber status information, indicating whether that subscriber, is entitled to receive, any of the TOTAL CHANNELS, and which, if any, of the EBTV channels, that subscriber, is not entitled to receive; (e) transmits the TOTAL CHANNELS' TV signals, to the subscriber, if the subscriber status information, indicates that subscriber, is entitled to receive, at least some of the TOTAL CHANNELS; (f) generates a local fixed frequency, the amplitude and frequency of which, are fixed and stable, which, each time it is combined, with a different one, of the six different head end generated pfxs, will result in a new frequency, that is suitable for jamming, a different one of the television signals, of the EBTV channels, and therefore, is a jamming signal, hereinafter referred to in general, as, "pfxj"; (g) mixes the local fixed frequency, with the pfx, thereby creating, jamming signal pfxj; (h) combines the pfxj, with the TOTAL CHANNELS' TV signals, that are going to the subscriber, when the pfxj, is for one of the channels, that the subscriber status information, indicates that subscriber is not entitled to receive.

Figure 1:
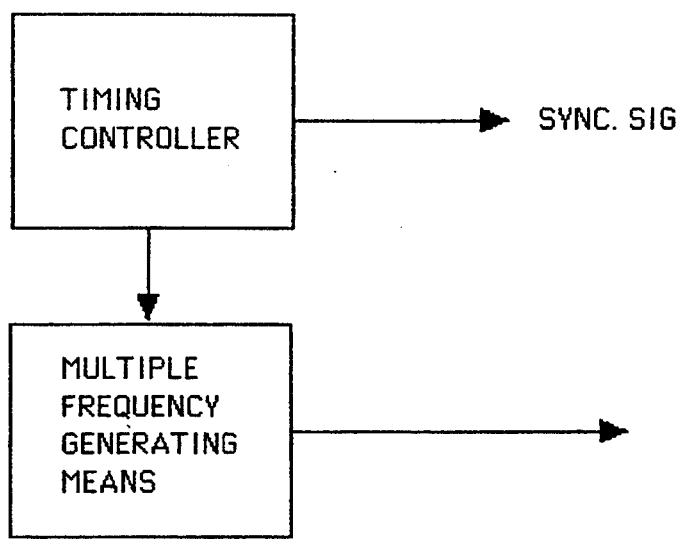
FIG. 1 is a block diagram, of an embodiment, of a general head-end.
Figure 1A:
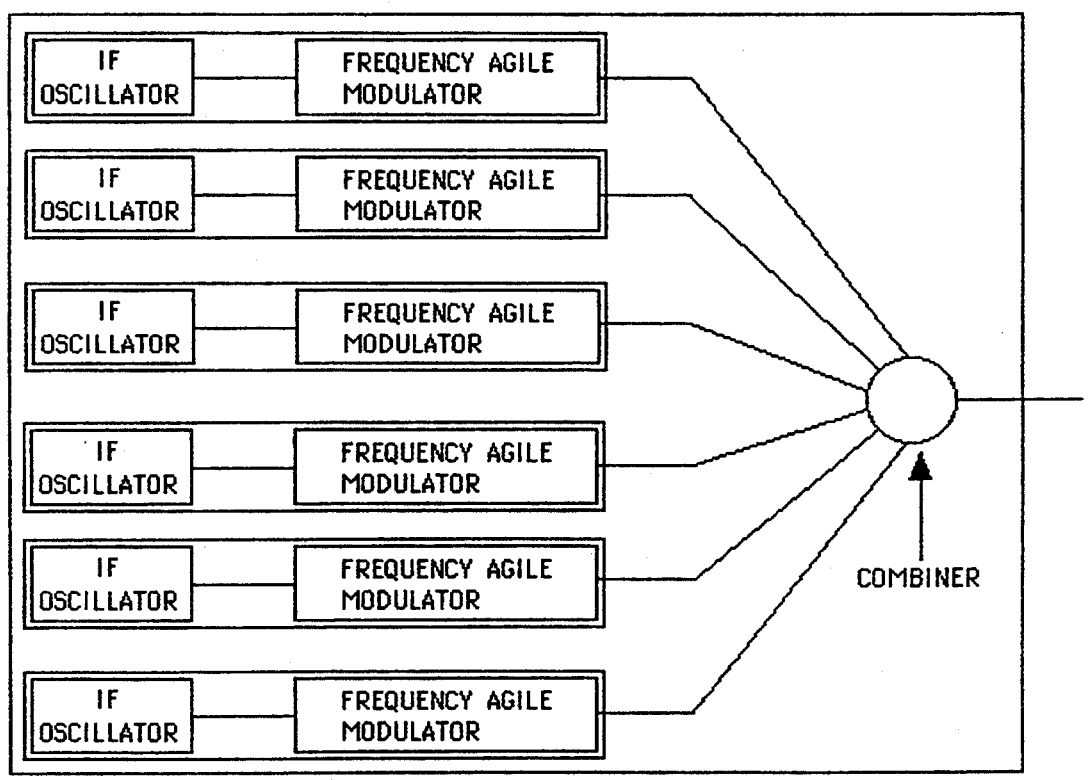
FIG. 1A is a block diagram, of an embodiment, of a multiple frequency generating means, suitable for use in the head end illustrated in FIG. 1.
Figure 2:
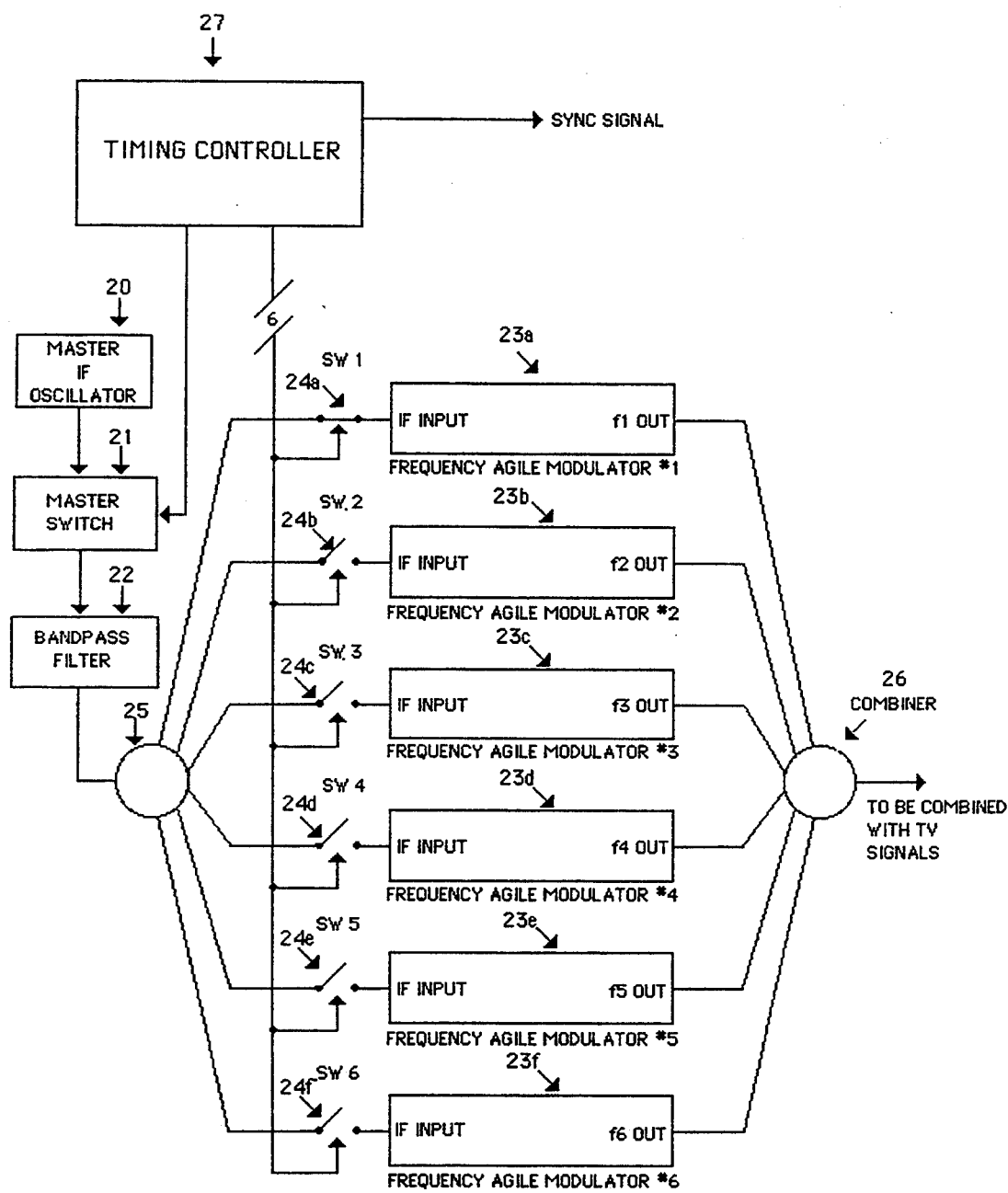
FIG. 2 is a block diagram, of a preferred embodiment, of the head end equipment, that produces the six different frequencies, each of which frequencies, are stable in both amplitude and frequency.
Figure 4:
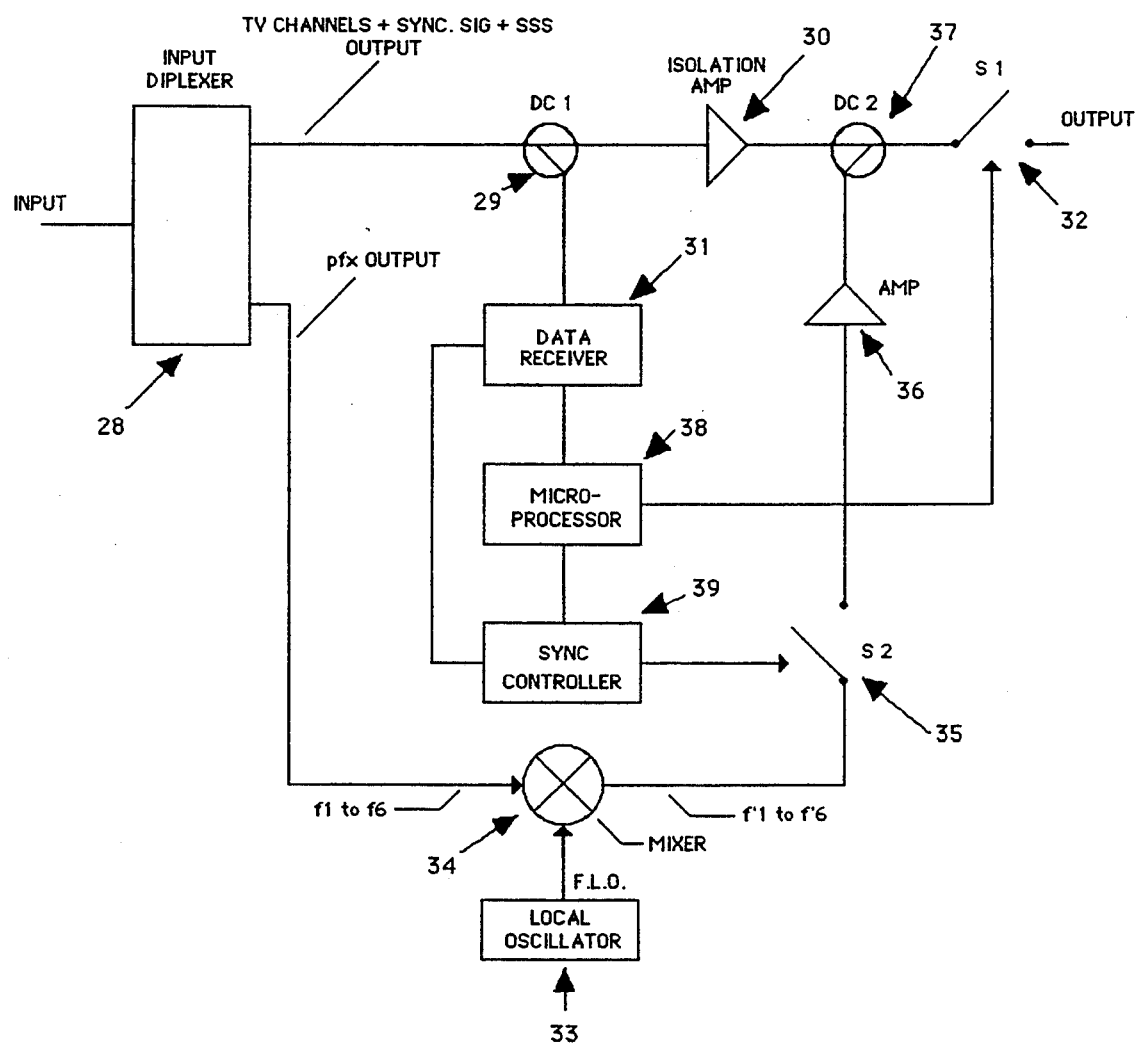
FIG. 4 is a block diagram, of a preferred embodiment, of a seven tier receiver end.

A preferred embodiment, of an apparatus, of the instant invention, for selectively controlling, subscriber access, to the TOTAL CHANNELS, which are being transmitted, over a controlled access medium, which controlled access medium, is also transmitting Subscriber Status Signal "SSS"s, which were generated from a center, and each of which, identifies which receiver end, it is intended for, and if that receiver end, should output to the subscriber, the TOTAL CHANNELS, and which, if any, of the EBTV channels, that receiver end, should jam; is comprised of: a head-end system, as illustrated in FIG. 2; and a multiple of receiver ends, each of which, are identical, to the receiver end, illustrated in FIG. 4. The head end, illustrated in FIG. 2, is comprised of: (i) a master IF oscillator 20, that generates a signal, of a predetermined frequency, that is stable, in both amplitude and frequency (preferably 45 MHz); (ii) a master RF switch ("MRF") 21, that receives the signal, from the master IF oscillator; (iii) a bandpass filter 22, that receives the signal, from the MRF, and which further reduces the harmonics, caused by the switching, of the master IF oscillator; (iv) six frequency agile modulators, 23a to 23f; (v) six RF switches, 24a to 24f; (vi) a splitter 25, that divides the outputted signal, from the bandpass filter, six ways, one to each of the six RF switches; (vii) a combiner 26, that merges the outputs of the six frequency agile modulators, into one main output, which is to be combined, with the TV signals; (viii) a timing controller 27 ("TC"), that closes and opens the MRF, for a predetermined duration, at fixed intervals (the pre-determined closed duration is preferably 10 microseconds), and sequentially, closes and opens, and continues to sequentially close, and open, each of the six RF switches, beginning with the first one, for approximately the same predetermined duration, at the same fixed intervals, as it closes, and opens, the MRF, to enable the six frequency agile modulators, to sequentially receive, the signal bursts, from the bandpass filter; (xiv) the six frequency agile modulators, therefore output, six different predetermined frequencies, each of which frequencies, is stable, in both amplitude and frequency, and each of which lasts, for a predetermined duration, preferably 10 microseconds, (each of which six different predetermined frequencies, are hereinafter referred to, in general, as, "pfx"); (xv) wherein the TC, also puts out, a synchronization signal ("sync. sig.") that identifies, which of the six different pfxs, is being generated.

The receiver end, illustrated in FIG. 4, is a seven tier station, consisting of two bands of channels, basic and extended basic service, plus six individual EBTV channels, each of which, must be individually controllable. The FIG. 4 receiver end, is comprised of: (xvi) an input diplexer 28, that receives the TOTAL CHANNELS' TV signals, the SSS, the pfx, and the sync. sig., and which outputs, the TOTAL CHANNELS' TV signals, the SSS, and the sync. sig., at a first output, and which outputs the pfx, at a second output; (xvii) a first directional coupler 29, that receives the signals, from the first output, of the input diplexer; (xviii) an isolation amplifier 30, that receives the signals, from the first directional coupler; (xix) a data receiver 31, that also receives the signals, from the first directional coupler, and extracts the SSS, from the group of signals fed to it, and extracts the sync. sig., from the group of signals fed to it, and demodulates the sync. sig., and demodulates the SSS; (xx) a first receiver RF switch 32, that receives the signals, from the output of the isolation amplifier, and which either transmits, or prevents the transmission, of the signals, to the subscriber; (xxi) a local oscillator 33, that generates a predetermined local fixed frequency, the amplitude and frequency of which, are fixed and stable, which, each time it is combined, with a different one, of the six different, head end generated pfxs, will result in a new frequency, that is suitable for jamming a different one of the television signals, of the EBTV channels, and therefore, is a jamming signal, hereinafter referred to in general, as, "pfxj"; (xxii) a mixer 34, to mix the predetermined local fixed frequency, with the pfx, outputted at the second output, of the input diplexer, thereby creating jamming signal pfxj; (xxiii) a second receiver RF switch 35, that receives the pfxj, from the mixer 34; (xxiv) an amplifier 36, suitable for raising the level of pfxj, in order to achieve effective jamming; (xxv) a second directional coupler 37, that couples the output of the amplifier 36, with the output of the isolation amplifier 30, at an intermediate point, between the isolation amplifier, and the first receiver RF switch; (xxvi) a microprocessor 38, that receives the demodulated SSS, from the data receiver, decodes the SSS, to determine whether or not the subscriber is authorized to receive the BTV channels, and which, if any, of the EBTV channels, the subscriber is authorized to receive, and if the subscriber is not authorized to receive any TV channels, prevents the first receiver RF switch, from closing, and if the subscriber is authorized to receive some or all TV channels, prevents the first receiver RF switch, from opening; (xxvii) a synchronization controller 39, that receives the demodulated sync. sig., from the data receiver, and the demodulated SSS, from the microprocessor, decodes the SSS, and the sync. sig., and causes the second receiver RF switch, to close, whenever the pfxj, is jamming a TV channel, that the subscriber, is not authorized to receive, thereby transmitting the pfxj, to the amplifier 36, and thereby to the subscriber, via the first RF switch 32.

In the preferred embodiment, the input diplexer, is a frequency dependent signal splitter; it has one broadband input port, one output port, from which the TV signals and the sync. sig. and SSS emerge, and one output port, from which the pfx emerges.

In the preferred embodiment, at the head end, the SSS is frequency shift key ("fsk") modulated onto the carrier wave, while the sync. sig., is amplitude modulated onto the carrier wave.

In the preferred embodiment, the data receiver contains an fsk demodulator section, and an amplitude demodulator section. The fsk demodulator section, feeds the microprocessor, with the demodulated SSS, and the amplitude demodulator section, feeds the synchronization controller, with the demodulated sync. sig.

Figure 3:
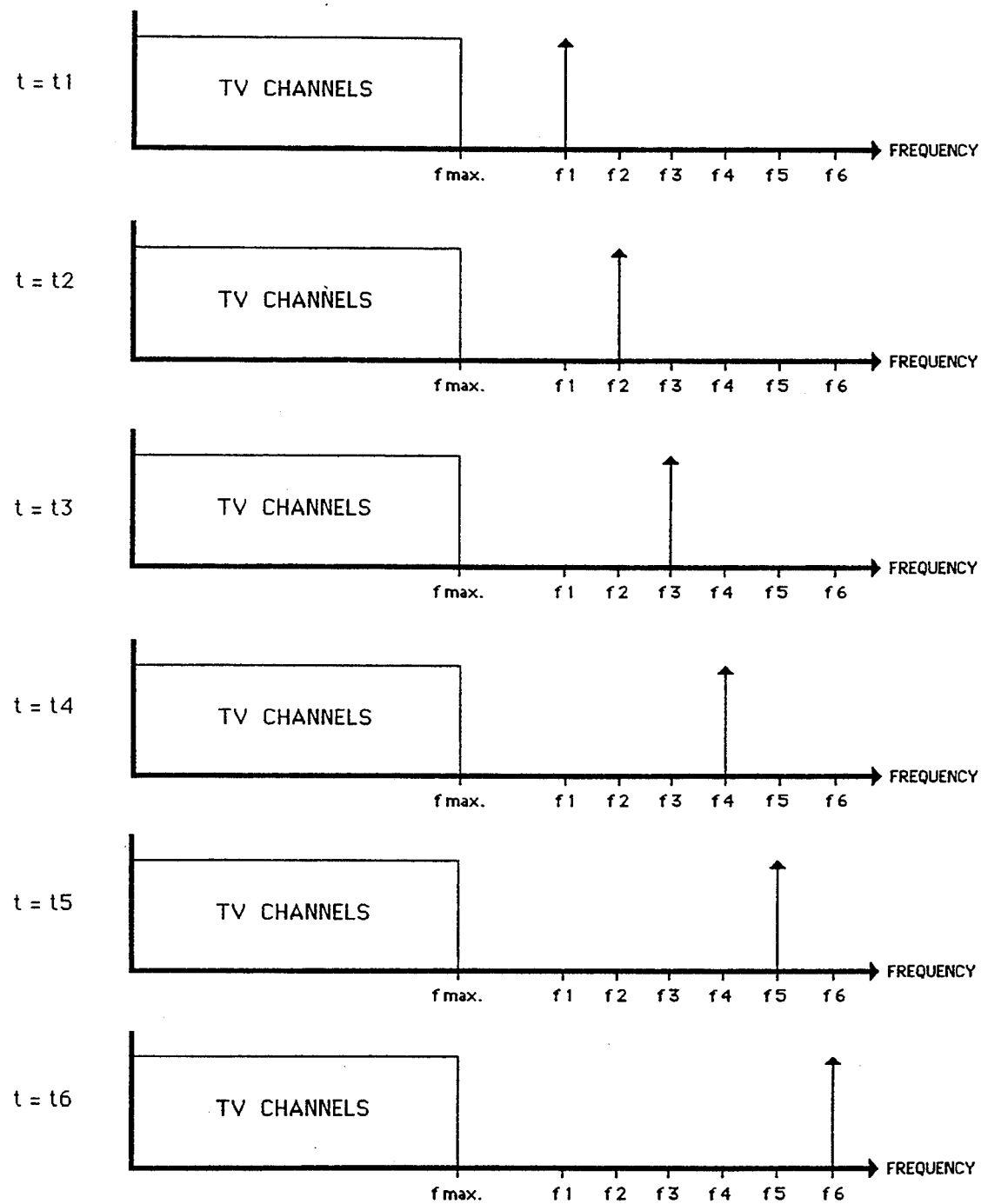
FIG. 3 is a relative frequency chart, that indicates the six different head end pfxs, relative to the carrier wave frequency, of the TOTAL CHANNELS.
Figure 5:
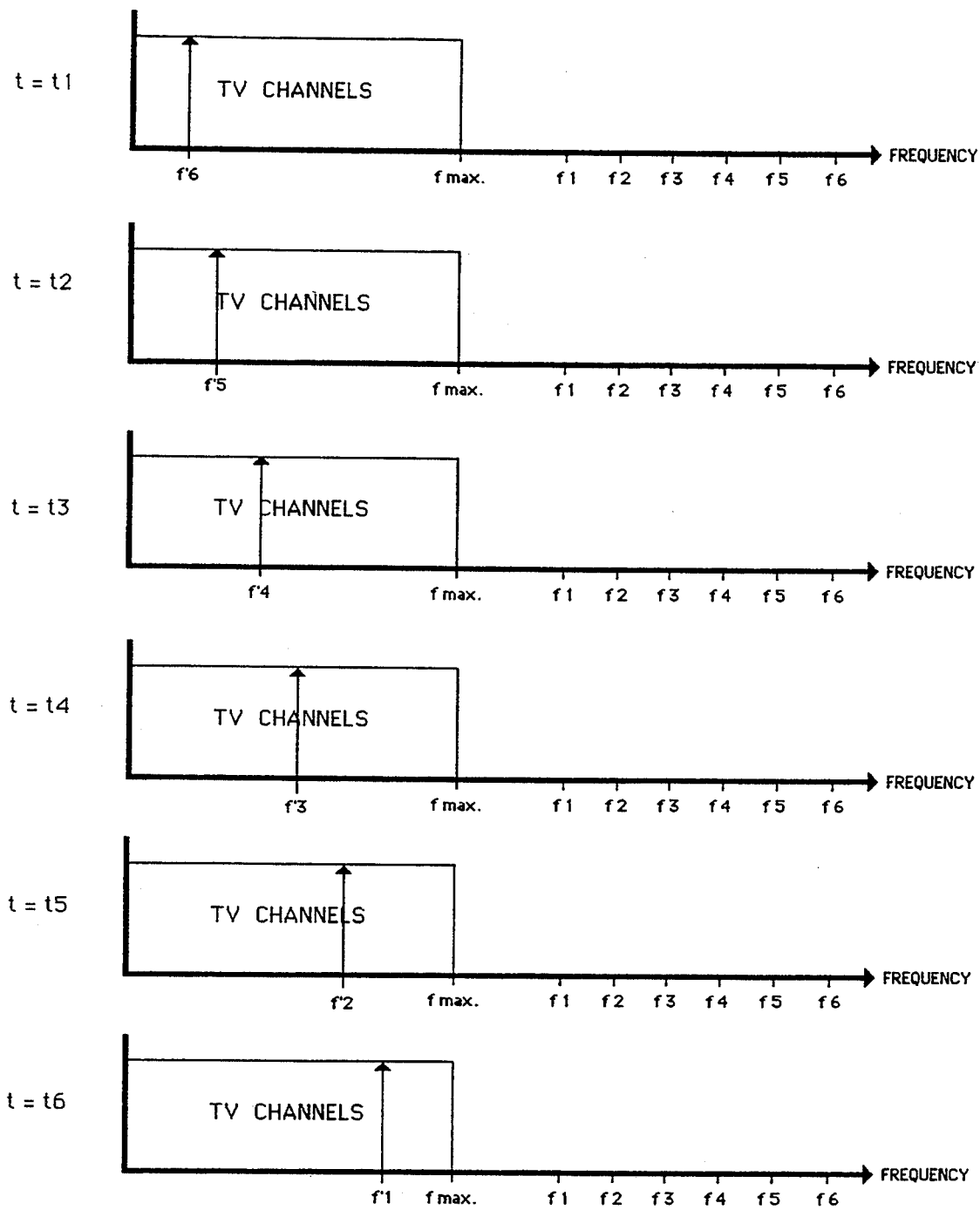
FIG. 5 is a relative frequency chart, that indicates the six different head end pfxs, relative to the carrier wave frequencies, of the TOTAL CHANNELS, after they have been, each, in turn, mixed with the local fixed frequency, at the receiver end.
Figure 6:
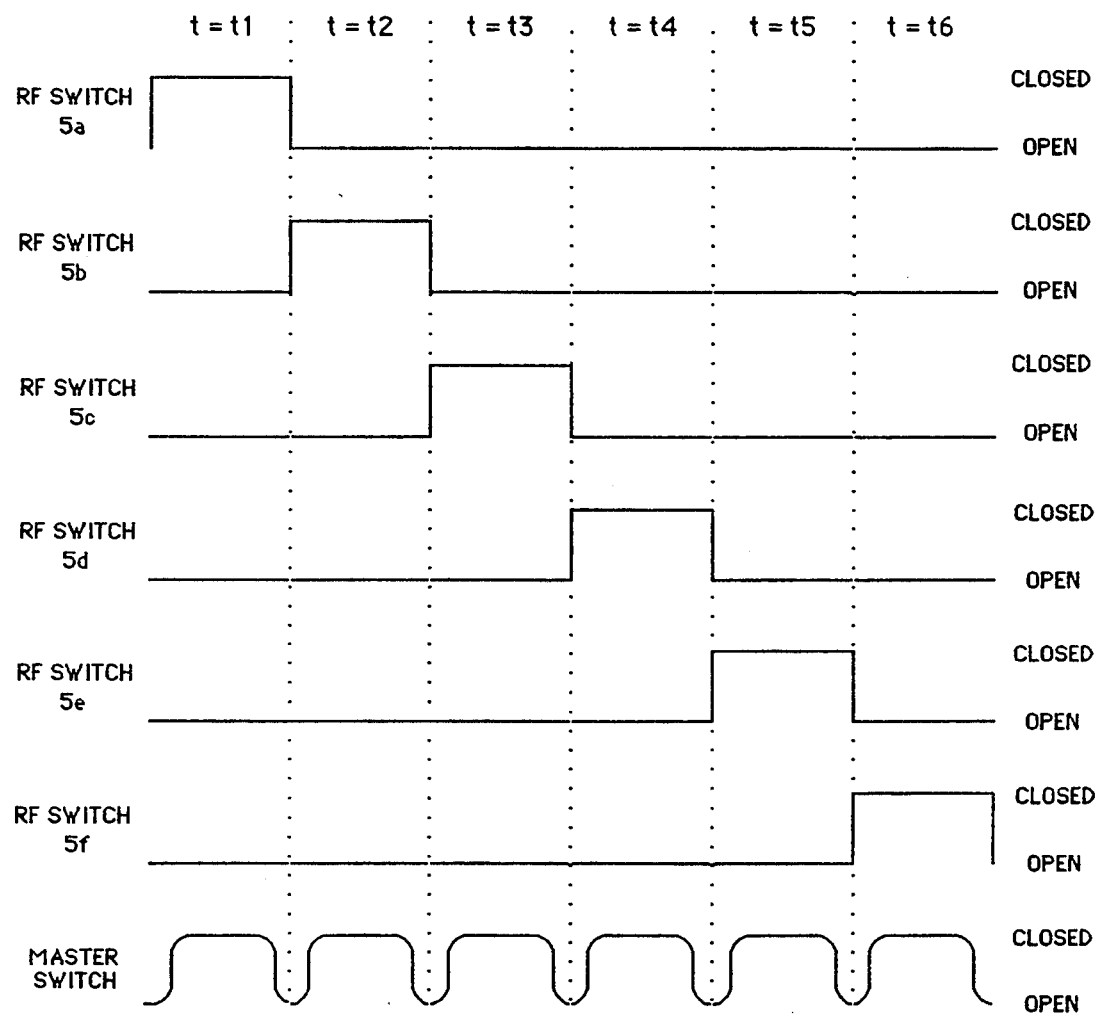
FIG. 6 is a Master Switch, and RF Switch, timing diagram.

The output of the mixer, is a signal, whose frequency corresponds to the numerical sum of the two input frequencies, and a signal, whose frequency corresponds to the numerical difference of the two input frequencies; the system of the just described preferred embodiment, only uses the difference signal. FIG. 3 illustrates the pfxs transmitted from the head end; FIG. 5 illustrates the pfxjs (i.e. the pfxs after the pre-determined local fixed frequency has been mixed with them).

To add on a second tier of TV channels, that are being controlled, only a small amount of additional components, must be added to the receiver ends, no additional components, have to be added to the head end.

Figure 7:
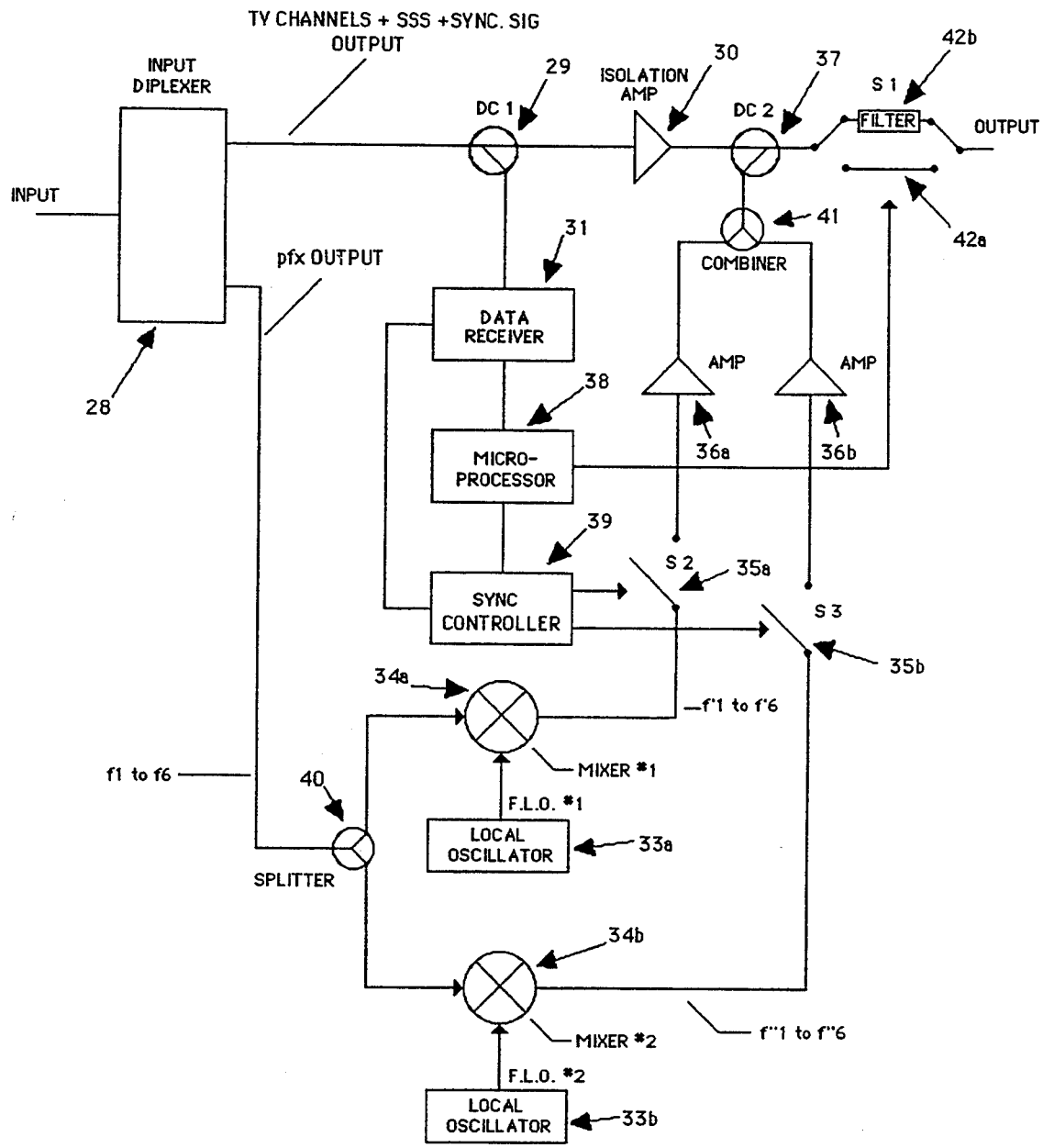
FIG. 7 is a block diagram, of a preferred embodiment, of a fourteen tier receiver end.

FIG. 7, illustrates the preferred embodiment, of a receiver end, for selectively jamming, a second tier of TV channels. The FIG. 7 receiver end, is therefore a fourteen tier receiver end. The fourteen tiers, consist of 2 bands channels, basic channels, and extended basic channels, the extended basic channels, consists of twelve individual EBTV channels, each of which is individually controllable. The differences between the FIG. 4 construction, and the FIG. 7 construction, will be readily apparent, to those skilled in the art.

A preferred embodiment, of the method of the instant invention, when a second tier of TV channels are to be controlled, is comprised of the same steps, as the earlier described preferred embodiment, of a method of the invention, and additionally includes, at each receiver end: (i) a means to take the signal, from the second output, of the input means, and send it, to each of two mixing means; (j) generating a second local fixed frequency, the amplitude and frequency of which, are fixed and stable, which, each time it is combined, with a different one, of the six different head end generated pfxs, will result in a new frequency, that is suitable for jamming, a different one of the television signals, of the EBTV channels, and is a different frequency, than any of the pfxjs, that would be created, when the first local fixed frequency, is combined, with any, of the different ones, of the six different head end generated pfxs, and therefore, is a different jamming signal, hereinafter, also referred to in general, as, "pfxj"; (k) using a second fixed frequency mixing means, to mix the second local fixed frequency, with the pfx, thereby creating a jamming signal ("pfxj2"); and (l) combining the pfxj2, with the TOTAL CHANNELS' TV signals that are going to the subscriber, when the pfxj2, is for one of the channels, that the subscriber status information, indicates that subscriber, is not entitled to receive.

The additional components, contained in the FIG. 7 receiver end, are: (xxviii) a second local oscillator 33b, that generates a second predetermined local fixed frequency, the amplitude and frequency of which are fixed and stable; (xxix) a second mixer 34b, to mix the second pre-determined local fixed frequency, with the pfx, thereby creating a second jamming signal ("pfxj2"); (xxx) a splitter 40, which receives the pfx, from the second output, of the input diplexer, and sends it, to each of the first and second mixers, 34a and 34b; (xxxi) a third receiver RF switch 35b, that receives the pfxj2, from the mixer 34b; (xxxii) a second amplifier 36b, suitable for raising the level of pfxj2, in order to achieve effective jamming; (xxxiii) a combiner 41, that receives both the pfxj, and the pfxj2, and sends them to the second directional coupler 37; and (xxxiv) a filter 42b, intermediate between the second directional coupler, and the subscriber output. The filter 42b, filters out the EBTV channels' TV signals. Therefore, a subscriber who is only authorized to receive the BTV channels, will receive his signal, routed through filter 42b. A subscriber authorized to receive the BTV channels, and some or all of the EBTV channels, will receive his signal, through receiver RF switch 42a.

Figure 8:
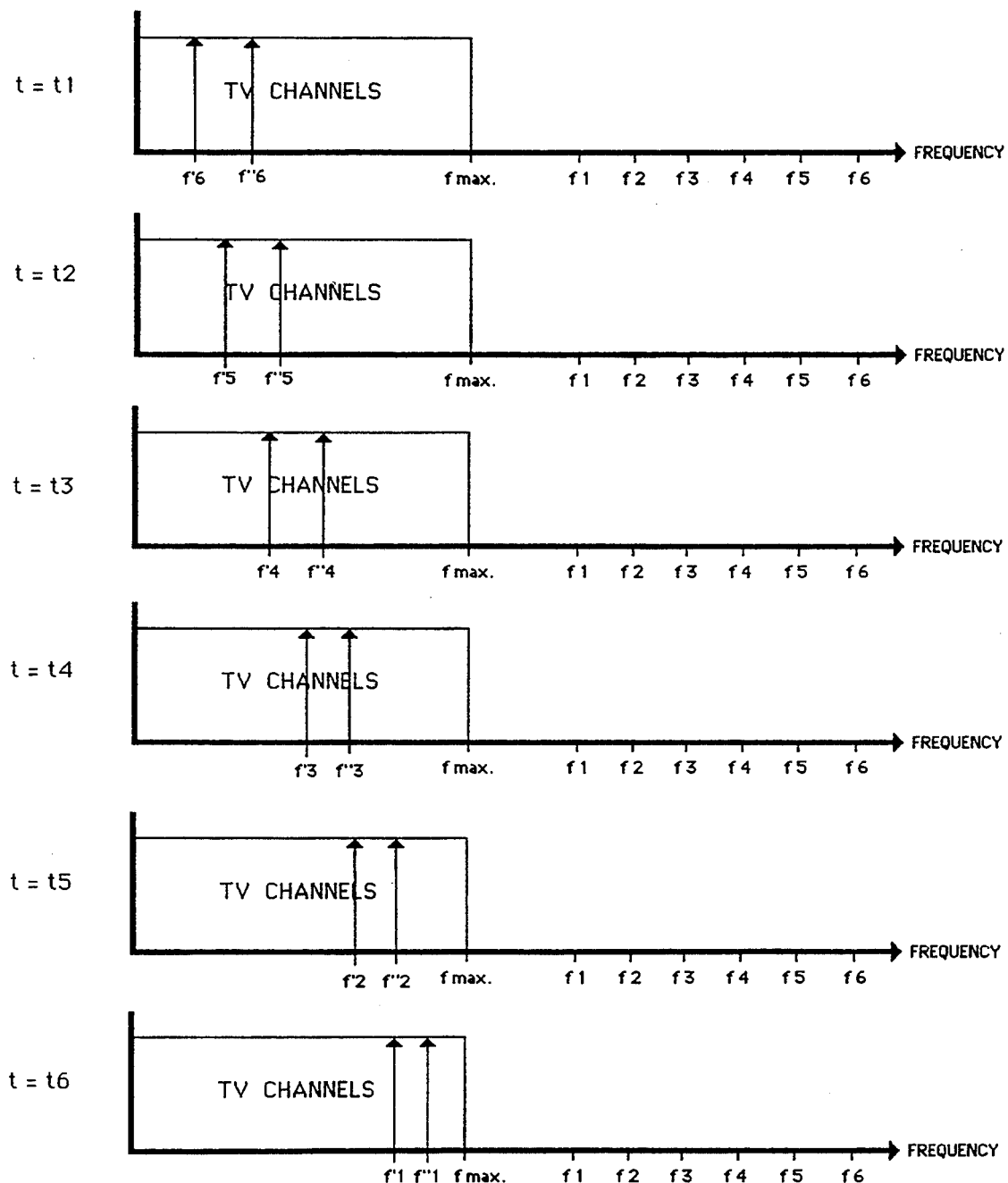
FIG. 8 is a relative frequency chart, that indicates the six different head end pfxs, relative to the carrier wave frequencies, of the TOTAL CHANNELS, after they have been doubled, by each in turn, having the local fixed frequency, added to it, and subtracted from it, at the receiver end.

The operation of the fourteen tier receiver end, is similar to the operation of the seven tier receiver end. The major difference, in the fourteen tier receiver end, is the addition, of a second mixer/local oscillator system. The fourteen tier receiver end, has two independent mixers, whose respective local oscillators, are set to different fixed frequencies. The pfx, is shifted by a different amount, when it is mixed, at the first mixer, with the first local fixed frequency, than it is, when it is mixed at the second mixer, with the second local fixed frequency. FIG. 8, illustrates the first mixer shifts, f'1 to f'6, and the second mixer shifts, f''1 to f''6. It can be seen, that the six different pfxs, generated at the head end, are converted into twelve usable jamming signals, at each of the receiver ends.

The fourteen tier, single subscriber, receiver end, as illustrated in FIG. 7, can easily be extended to serve multiple subscribers, as could a seven tier, twenty-one tier, or twenty-eight tier, receiver end, be easily extended, to serve two, three, or four subscribers.

Figure 13:
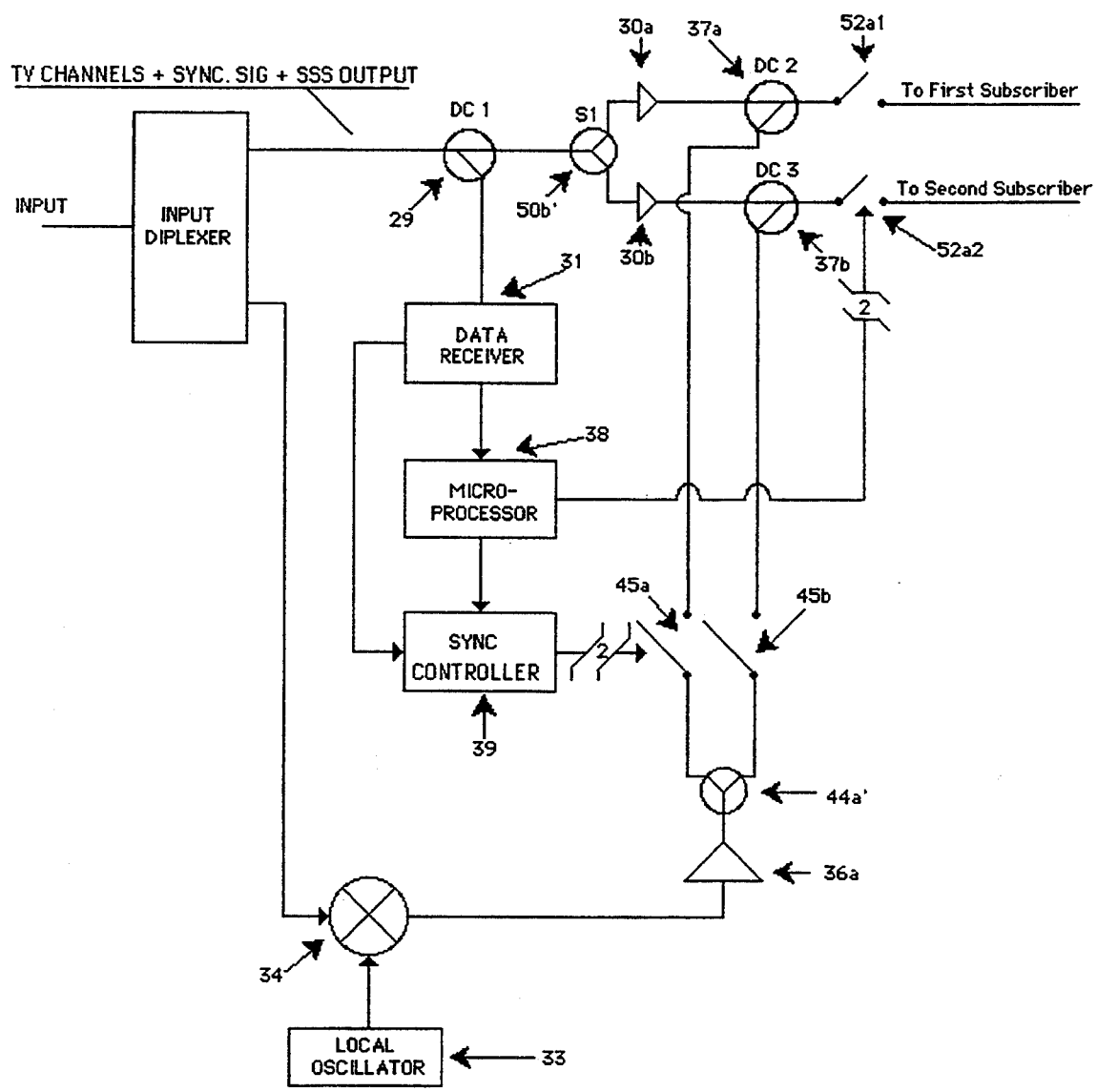
FIG. 13 is a block diagram, of a preferred embodiment, of a seven tier, two subscriber, receiver end.

FIG. 13, shows a seven tier receiver end, that has been extended, to serve two subscribers. The invention, having been disclosed, the variations are obvious, to one skilled in the art. The pfxj, is amplified, by amplifier 36a, at a point, before it is either transmitted, or not transmitted, to the subscribers. The reason that it is amplified before the RF switch, is so that only one amplifier is needed, for that purpose. However, it could be amplified at a point after the RF switches, 45a and 45b, which either transmit, or do not transmit, the pfxj. If the pfxj was amplified, at a point after the RF switches, 35a and 35b, that control its transmission, in the FIG. 7 embodiment, that two amplifiers are required, such as 36a and 36b, in FIG. 7. In FIG. 13, the splitter 44a, directs the amplified pfxj, to two RF switches, 45a and 45b. When the pfxj, is jamming a channel, that the First Subscriber is not entitled to receive, then the Synchronization Controller 39, closes RF switch 45a. When the pfxj, is jamming a channel, that the Second Subscriber is not entitled to receive, then the Synchronization Controller, closes RF switch 45b. The splitter 50b, divides the TOTAL CHANNELS' TV signals, transmitting it to amplifier 30a, and amplifier 30b. Directional Coupler 37a, combines the pfxj, whenever a pfxj is being transmitted, with the TOTAL CHANNELS' TV signal, being transmitted, to the First Subscriber. Directional Coupler 37b, combines the pfxj, whenever a pfxj is being transmitted, with the TOTAL CHANNELS' TV signal that is being transmitted to the Second Subscriber. Microprocessor 38, closes RF switch 52a1, if the First Subscriber, is entitled to receive, at least some of the TOTAL CHANNELS, and closes RF switch 52a2, if the Second Subscriber, is entitled to receive, at least some of the TOTAL CHANNELS.

Having disclosed the invention, to add a third subscriber, that was being serviced, by a receiver end, like the FIG. 13 receiver end, obvious additions, could be made to the FIG. 13 receiver end. A person skilled in the art, would readily see, that all that would be needed, is to replace splitters 44a' and 50b', with splitters, that split the signal three ways, and then adding: an additional RF switch 45c, an additional amplifier 30c, an additional directional coupler 37c, an additional RF switch 52a3, and an additional subscriber line. To add a fourth subscriber, similar modifications would be made to the splitters 44a' and 50b', and similar further additions would be added.

Figure 9:
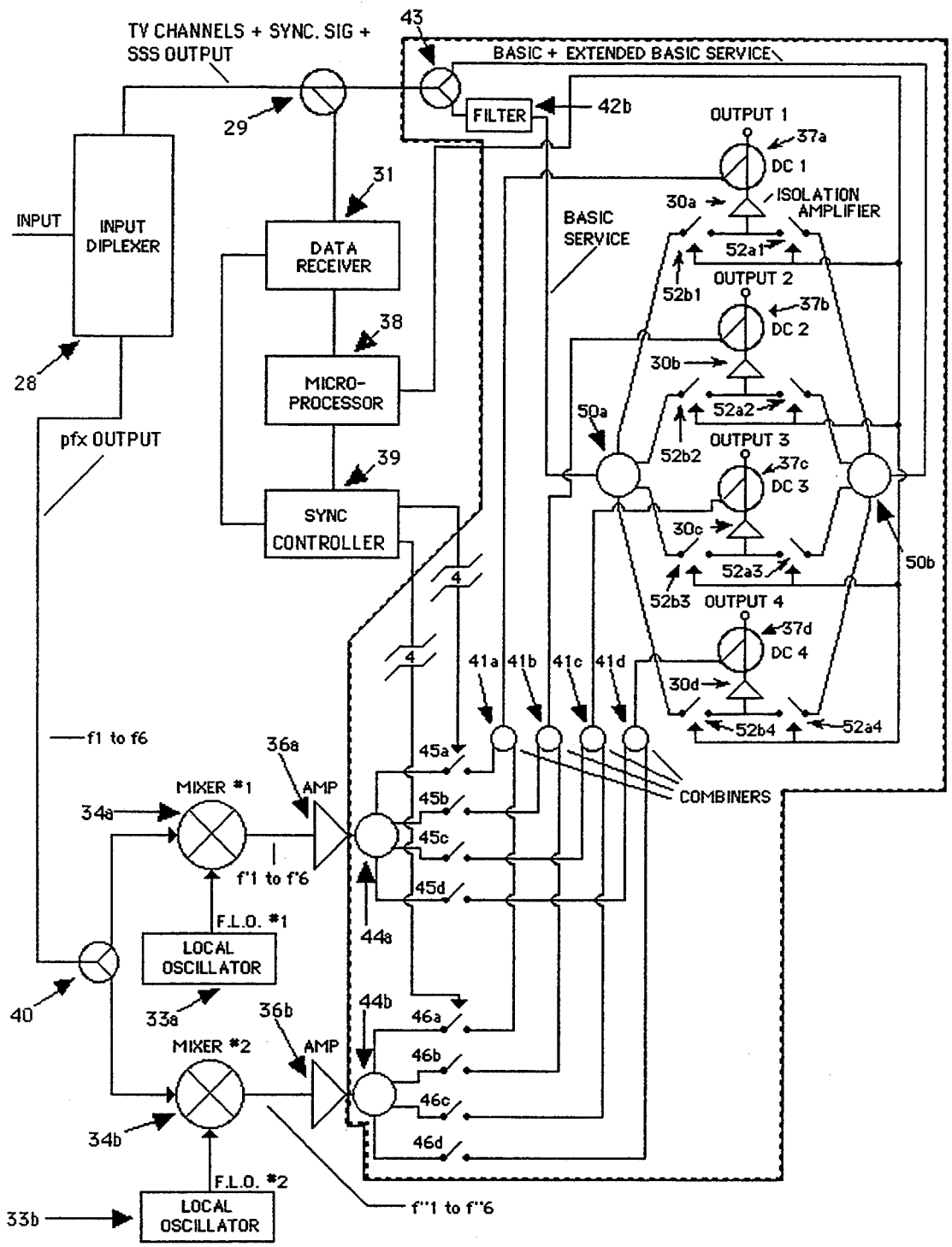
FIG. 9 is a block diagram, of a preferred embodiment, of a fourteen tier, four subscriber, receiver end.

FIG. 9 shows a fourteen tier receiver end, that can serve four different subscribers, each of which, may or may not, be authorized to receive, the BTV channels TV signals, and may or may not, be authorized to receive, the same, and/or different ones, of the EBTV channels. A noticeable advantage, of the four subscriber, fourteen tier receiver end, is that the functions, and costs, of the input diplexer, data receiver, microprocessor, synchronization controller, filter, and mixer/local oscillator system, are shared by the four subscribers.

The irregular enclosure, created by the dashed lines, of FIG. 9, section off the additional components, that extend the FIG. 9 receiver end, to serve four subscribers, all other components, and their operations, are the same as in the FIG. 7 receiver end, with one exception. In a receiver end designed to service more than one subscriber, the amplifier used to raise the level of the jamming signal, receives the jamming signal, directly from the mixer. It can be seen, in FIG. 9, that amplifiers 36a and 36b, are intermediate of the mixer, and the RF switch, that controls whether or not, the jamming signal, that goes to that amplifier, goes to the subscriber. In FIG. 7, the amplifiers 36a and 36b, receive their signal, from the RF switches, which controls, whether or not, that jamming signal, goes to the subscriber, and which RF switches, 35a and 35b, are intermediate, between the respective mixers, and the amplifiers 36a and 36b.

The FIG. 9 embodiment receiver end, contains four additional splitters, 44a and 44b, and 50a and 50b. It also contains six additional RF switches, 45b, 45c, 45d, 46b, 46c, and 46d, which control, whether a particular jamming signal, goes to a particular subscriber. RF switches 45a and 45b, of the FIG. 9 embodiment, are the equivalent of RF switches 35a and 35b, of the FIG. 7 embodiment. The FIG. 9 embodiment, also contains three additional combiners, 41b, 41c, and 41d, that the FIG. 7 embodiment, does not contain; combiner 41a, of the FIG. 9 embodiment, is the same as combiner 41, of the FIG. 7 embodiment. The FIG. 9 embodiment, also contains, three additional isolation amplifiers 30b, 30c, and 30d, that the FIG. 7 embodiment, does not contain; 30a, of the FIG. 9 embodiment, is the equivalent, of 30, of the FIG. 7 embodiment. The FIG. 9 embodiment, also contains, three additional RF switches, to prevent, or transmit, the filtered TV Channels' signals, to the subscribers, 52b2, 52b3, and 52b4, that the FIG. 7 embodiment, does not contain; 52b1, of the FIG. 9 embodiment, is the equivalent, of 42b, of the FIG. 7 embodiment. The FIG. 9 embodiment, also contains, three additional RF switches, to prevent, or transmit, the unfiltered TV Channels' signals, to the subscribers, 52a2, 52a3, and 52a4, that the FIG. 7 embodiment, does not contain; 52a1, of the FIG. 9 embodiment, is the equivalent of 42a, of the FIG. 7 embodiment. The embodiment shown in FIG. 9, also contains, four directional couplers, 37a to 37d, that combine, a transmitted jamming signal, with the TOTAL CHANNELS' TV signals, whereas the embodiment shown in FIG. 7, only contains one directional coupler, that performs the same function.

A subscriber, that is only authorized to receive, the BTV channels, will have his receiver RF switch, that comes off of splitter 50a, closed, and his receiver RF switch, that comes off of splitter 50b, open. Splitter 50a, receives its signal, through filter 42b, which filters out the EBTV channels' TV signals. Splitter 50b, receives its signal, from splitter 43, which transmits the TOTAL CHANNELS' TV signals.

Combiner 41a, performs the same function, for the first subscriber, receiving TV channels, from the FIG. 9 receiver end, as does combiner 41, of the FIG. 7 receiver end. Similarly, combiner 41b, performs the same function, for the second subscriber, receiving TV channels, from the FIG. 9 receiver end, as does combiner 41, of the FIG. 7 receiver end, and so on. Receiver RF switch 45a, performs the same function, for the first subscriber, receiving TV channels, from the FIG. 9 receiver end, as does receiver RF switch 35a, of the FIG. 7 receiver end. Receiver RF switch 45b, performs the same function, for the second subscriber, receiving TV channels, from the FIG. 9 receiver end, as does receiver RF switch 35a, of the FIG. 7 receiver end, and so on. Receiver RF switch 46a, performs the same function, for the first subscriber, receiving TV channels, from the FIG. 9 receiver end, as does receiver RF switch 35b, of the FIG. 7 receiver end. Receiver RF switch 46b, performs the same function, for the second subscriber receiving TV channels, from the FIG. 9 receiver end, as does receiver RF switch 35b, of the FIG. 7 receiver end, and so on.

The FIG. 7 embodiment, is designed to serve, only one subscriber, therefore, it does not require splitters, to divide the jamming signals, or the TOTAL CHANNELS' TV signals, as must be done in the FIG. 9 embodiment, by splitters 44a, 44b, 50a and 50b. In the FIG. 9 embodiment, those splitters, divide the jamming signals, and the TOTAL CHANNELS' TV signals, respectively, each, onto four separate lines, so that they can be separately controlled, to each of the four separate subscribers, that the FIG. 9 embodiment, is designed to serve.

A fourteen tier receiver end, capable of serving two subscribers, but not capable of serving four subscribers, would be as illustrated in FIG. 9, except that the following components would be eliminated: two of RF switches 45a to 45d, two of RF switches 46a to 46d, two of combiners 41a to 41d, two of outputs 1 to 4, two of RF switches 52b1 to 52b4, two of RF switches 52a1 to 52a4, two of directional couplers 37a to 37d, and two of isolation amplifiers 30a to 30d.

A fourteen tier receiver end, capable of serving three subscribers, but not capable of serving four subscribers, would be as illustrated in FIG. 9, except that the following components would be eliminated: one of RF switches 45a to 45d, one of RF switches 46a to 46d, one of combiners 41a to 41d, one of outputs 1 to 4, one of RF switches 52b1 to 52b4, one of RF switches 52a1 to 52a4, one of directional couplers 37a to 37d, and one of isolation amplifiers 30a to 30d.

Those skilled in the art, will readily see, that implementing a twenty-one tier, or twenty-four tier, receiver end, can be easily done, in the instant invention, by the addition, of one or two, additional mixer/local oscillator systems, to the FIG. 7, or FIG. 9, receiver ends, without any additional components added to the head end.

A preferred embodiment, of the method of the instant invention, when a third tier of TV channels are to be controlled, is comprised of the same steps, as the earlier described preferred embodiment, of a method of the invention, for a two tier system, and additionally includes, at each receiver end: (i) a means to take the signal, from the second output, of the input means, and send it, to each of three mixing means; (j) generating a third local fixed frequency, the amplitude and frequency of which, are fixed and stable, which, each time it is combined, with a different one, of the six different head end generated pfxs, will result in a new frequency, that is suitable for jamming, a different one, of the television signals, of the EBTV channels, and is a different frequency, than any of the pfxjs, that would be created, when the first and second local fixed frequencies, are combined, with any of the different ones, of the six different, head end generated pfxs, and therefore, is a different jamming signal, hereinafter, also referred to in general, as, "pfxj"; (k) using a third fixed frequency mixing means, to mix the third local fixed frequency, with the pfx, thereby creating, a jamming signal ("pfxj3"); and (l) combining the pfxj3, with the TOTAL CHANNELS' TV signals, that are going to the subscriber, when the pfxj3, is for one of the channels, the subscriber status information, indicates that subscriber, is not entitled to receive.

The additional components, required for a three tier receiver end, are: a third local oscillator, that generates a third pre-determined local fixed frequency, the amplitude and frequency of which, are fixed and stable, which, each time it is combined, with a different one, of the six different head end generated pfxs, will result in a new frequency, that is suitable for jamming, a different one, of the television signals, of the EBTV channels, and is a different frequency, than any of the pfxjs, that would be created, when the first and second local fixed frequencies, are combined, with any of the different ones, of the six different head end generated pfxs, and therefore, is a different jamming signal, hereinafter also referred to in general, as, "pfxj"; a third mixer, to mix the third pre-determined local fixed frequency, with the pfx, thereby creating a third jamming signal ("pfxj3"); an additional splitter, which receives the pfx, from the second output, of the input diplexer, and sends it, to each of the first, second, and third mixers; a fourth receiver RF switch, that receives the pfxj3, from the mixer; a third amplifier, suitable for raising the level of pfxj3, in order to achieve effective jamming; an additional combiner, that receives the pfxj, the pfxj2, and the pfxj3, and sends them, to the second directional coupler 37; and an additional filter, intermediate between the second directional coupler, and the subscriber output. The filter 42b, filters out the EBTV channels' TV signals. Therefore, a subscriber, who is only authorized to receive, the BTV channels, will receive his signal, routed through filter 42b. A subscriber authorized to receive, the BTV channels, and some, or all, of the EBTV channels, will receive his signal, through receiver RF switch 42a.

The operation, of the twenty-one tier receiver end, is similar to the operation, of the seven tier receiver end. The major difference, in the twenty-one tier receiver end, is the addition, of a second, and a third mixer/local oscillator system. The twenty-one tier receiver end, has three independent mixers, whose respective local oscillators, are set to different fixed frequencies. The pfx, is shifted by a different amount, when it is mixed, at the first mixer, and by a different amount, when it is mixed, at the second mixer, and by a different amount, when it is mixed, at the third mixer.

By analogy, a twenty-eight tier receiver end, can readily be constructed, in this invention, by those skilled in the art.

For all embodiments, the six fx or pfx signals, generated at the head end, can be located, in any unoccupied region of the spectrum. However, they must be in a band, of six adjacent channels, with a guard band, on both the upper, and lower ends. It should be clear, to those skilled in the art, that the locally generated fixed frequency(ies), generated at the receiver ends, must be situated, at a particular location, so that the sum, and/or difference, signals (i.e. the pfxj, pfxj2, etc.) will fall upon the video carrier frequencies of the TV channels to be selectively jammed by the pfxj, pfxj2, etc.

Figure 10:
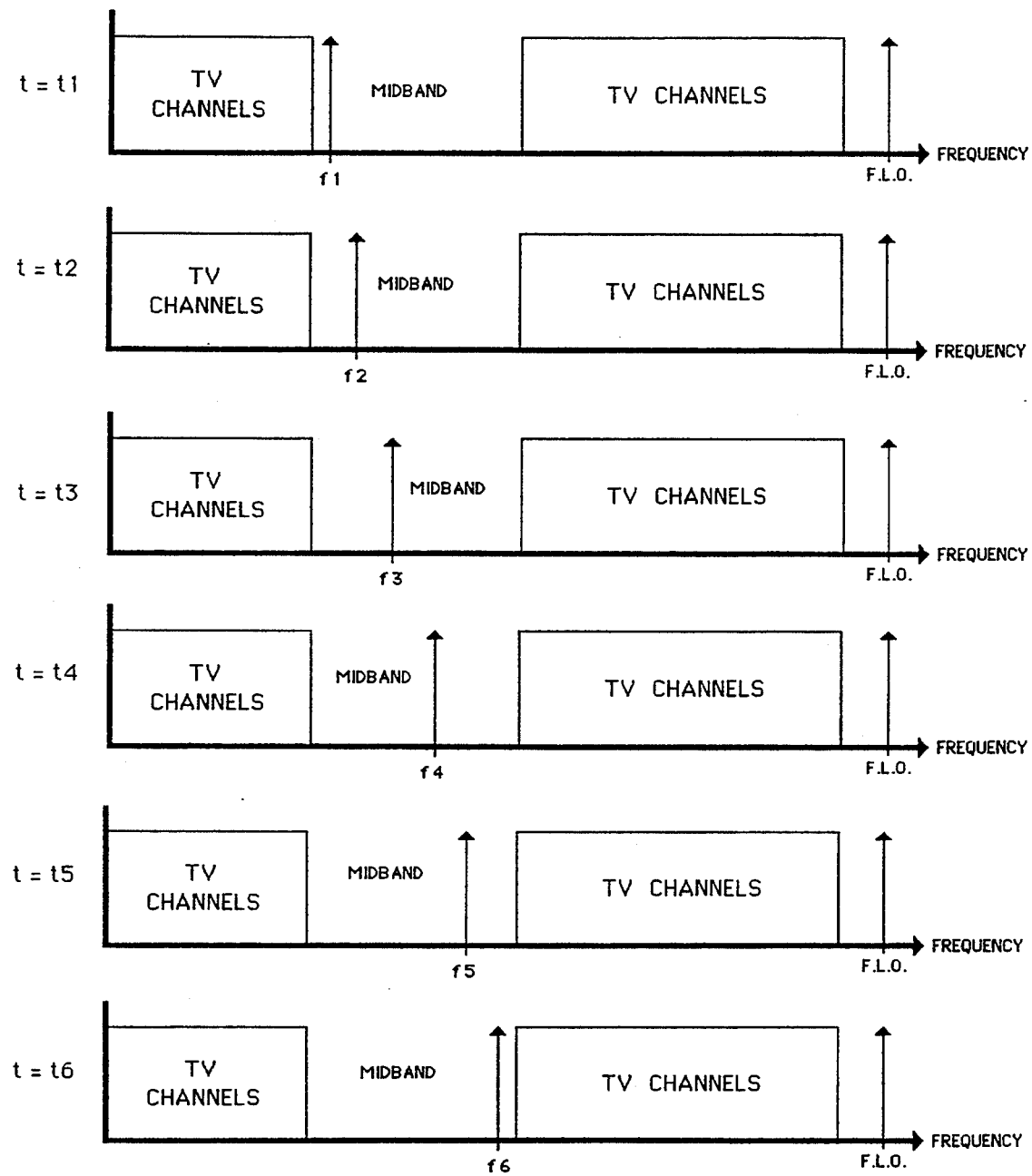
FIG. 10 is a relative frequency chart, where the pfxs, are in the midband, and the locally generated fixed frequency, is in the region above the spectrum, of the TV channels, wherein the difference signals, are used to selectively jam TV channels.

FIG. 10, shows the pfx in the midband, and the locally generated fixed frequency, in the region above the spectrum, of the TOTAL CHANNELS. That system, would use the difference signals, resulting from the mixing, of the pfxs, and the locally generated fixed frequency.

Figure 11:
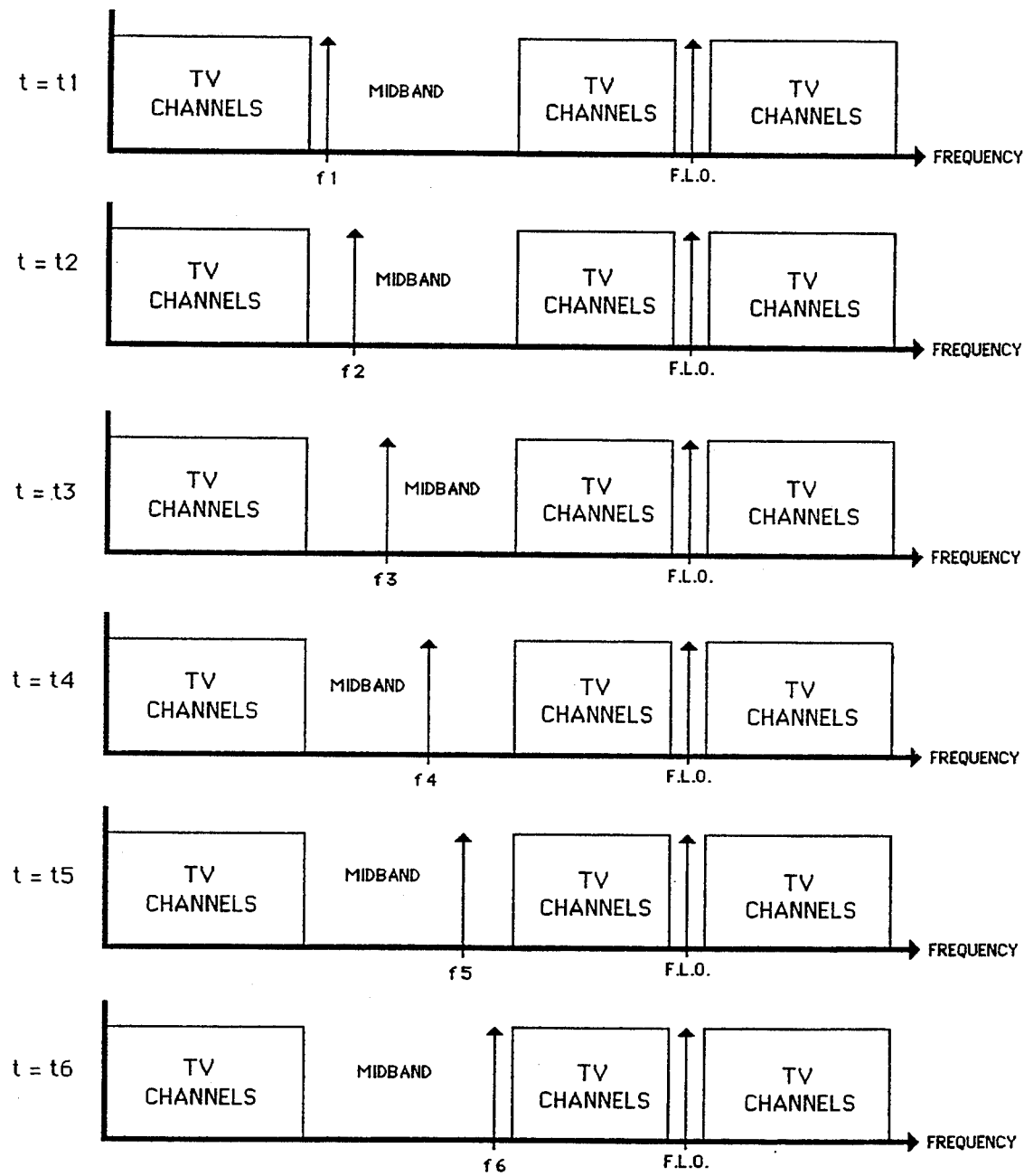
FIG. 11 is a relative frequency chart, where the pfxs, are in the midband, and the locally generated fixed frequency, occupies one channel slot, within the spectrum of TV channels, wherein both the difference signals, and sum signals, may be used, to selectively jam TV channels.
Figure 12:
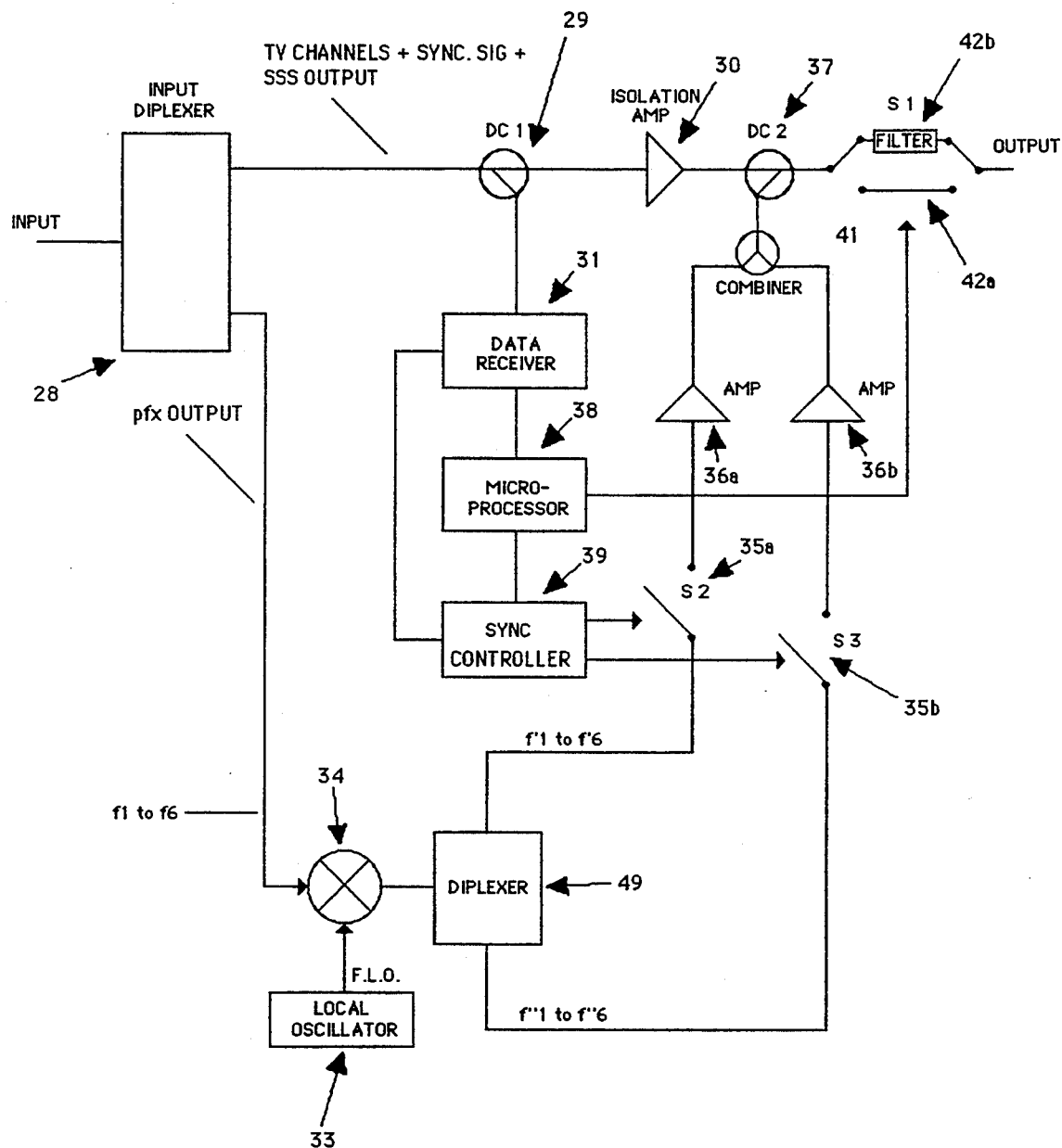
FIG. 12 is a block diagram, of a preferred embodiment, of a fourteen tier receiver end, that is useful, when the jamming signals, are in the midband, and the local oscillator, occupies one channel slot, within the spectrum of the TV channels, wherein only one local fixed frequency, is generated, and a diplexer is used.

FIG. 11, shows the spectrum, where the pfxs are in the midband, and the locally generated fixed frequency, occupies one channel slot, within the spectrum of the TOTAL CHANNELS. When a configuration such as illustrated in FIG. 11, is used, a fourteen tier receiver end, can be designed, as illustrated in FIG. 12, which makes use, of both the sum, and difference signals, that are created, when the pfx, is combined with the locally generated fixed frequency. The receiver end, illustrated in FIG. 12, operates basically the same as that illustrated in FIG. 7; the main differences, are in the addition, of a second diplexer, and the removal, of the second mixer/local oscillator system. The second diplexer, separates the sum and difference signals, and directs them to their respective receiver RF switches. Those skilled in the art, will see that a four subscriber receiver end, could be constructed using the FIG. 12 receiver end, in the same way, as a four subscriber receiver end, could have been constructed, from the FIG. 7 illustrated receiver end, as was shown in the FIG. 9 receiver end.

Those skilled in the art, will readily see other modifications, that are obviously a part of the instant invention. For example, those skilled in the art, will readily see, from the instant disclosure and diagrams, how to build, from seven to twenty-eight tier receiver ends, that can be made to each serve a multiple of subscribers. Further modifications, will also be obvious, to those skilled in the art. This disclosure, is illustrative of the invention, and not a limitation of the invention. All such modifications, and alternatives, which do not depart from the teachings of this invention, are intended to be included in the invention, and in the claims.

We claim:

1. A method for selectively controlling subscriber access to the television channels in a CATV system, that transmits, from its head end, multiple channels' TV signals that every subscriber has access to (the "BTV channels") and multiple channels' TV signals that every subscriber may not have access to (the "EBTV channels"), wherein the BTV channels and the EBTV channels are together referred to as the "TOTAL CHANNELS", wherein the TOTAL CHANNELS' TV signals are transmitted from the head end on a system carrier wave, and wherein each subscriber receives access to some or all of the TOTAL CHANNELS through a receiver end, and wherein the CATV system, from its head end, is also transmitting subscriber status signals ("SSS"s), each of which identifies which subscriber's receiver end it is intended for, and which of the TOTAL CHANNELS' TV signals that subscriber's receiver end should jam the output of, which method is characterized in that it is comprised of the steps of:

(i) generating, from a head end, one at a time, six different predetermined frequencies (each of which are hereinafter referred to in general as "fx"), wherein each fx is stable in both amplitude and frequency;

(ii) generating, from the head end, a synchronization signal ("sync. sig.") that identifies which fx is being generated;

(iii) setting up a multiple of receiver ends, each of which:

(a) receives at one input, the TOTAL CHANNELS' TV signals, the SSS, the fx, and the sync. sig.;

(b) divides the received signals, into: (1) TOTAL CHANNELS' TV signals, SSS, and sync. sig., and (2) the fx;

(c) generates a local fixed frequency, which, each time it is combined with a different one of the six different fxs will result in a new frequency that is suitable for jamming a different one of the television signals of the EBTV channels, and therefore is a jamming signal;

(d) mixes the local fixed frequency with the fx, thereby creating a jamming signal;

(e) decoding the sync. sig.;

(f) decoding the SSS to obtain the subscriber status information that indicates whether that subscriber is entitled to receive any of the TOTAL CHANNELS, and which, if any, of the EBTV channels that subscriber is not entitled to receive;

(g) transmitting the TOTAL CHANNELS to the subscriber, if the subscriber status information indicates that subscriber is entitled to receive some or all of the TOTAL CHANNELS; and (h) combining the jamming signal with the TOTAL CHANNELS' TV signals that are going to the subscriber, when the created jamming signal is for one of the channels that the subscriber status information indicates that subscriber is not entitled to receive.

2. A method for selectively controlling subscriber access to the television channels in a CATV system, that transmits, from its head end multiple channels' TV signals that every subscriber has access to (the "BTV channels") and multiple channels' TV signals that every subscriber may not have access to (the "EBTV channels"), wherein the BTV channels and the EBTV channels are together referred to as the "TOTAL CHANNELS", wherein the TOTAL CHANNELS' TV signals are transmitted from the head end on a system carrier wave, and wherein each subscriber receives access to some or all of the TOTAL CHANNELS through a receiver end, and wherein the CATV system, from its head end, is also transmitting subscriber status signals ("SSS"s), each of which identifies which subscriber's receiver end it is intended for and which of the TOTAL CHANNELS' TV signals that subscriber's receiver end should jam the output of, which method is characterized in that it is comprised of the steps of:

(i) generating from the head end, one at a time, at predetermined intervals, six different predetermined frequencies, each of which frequencies is stable in both amplitude and frequency, and each of which frequencies lasts for a predetermined duration (each of which frequencies is hereinafter referred to in general as "pfx");

(ii) generating from the head end a synchronization signal, "sync. sig.", that identifies which pfx is being generated;

(iii) at the head end modulating the SSS onto the system carrier wave using frequency shift keying ("fsk");

(iv) at the head end amplitude modulating the sync. sig. onto the system carrier wave;

(v) at the head end, combining all of the head end generated signals, and the SSS, with the TOTAL CHANNELS' TV signals;

(vi) setting up a multiple of receiver ends, each of which:

(a) receives at one input, the TOTAL CHANNELS' TV signals, the SSS, the pfx, and the sync. sig.;

(b) divides the received signals into: (1) TOTAL CHANNELS' TV signals, SSS, and sync. sig., and (2) the pfx;

(c) decodes the sync. sig.;

(d) decodes the SSS to obtain the subscriber status information indicating whether that subscriber is entitled to receive any of the TOTAL CHANNELS, and which, if any, of the EBTV channels that subscriber is not entitled to receive;

(e) transmitting the TOTAL CHANNELS' TV signals to the subscriber, if the subscriber status information indicates that subscriber is entitled to receive at least some of the TOTAL CHANNELS;

(f) generating a local fixed frequency the amplitude and frequency of which are fixed and stable, which, each time it is combined with a different one of the six different pfxs will result in a new frequency that is suitable for jamming a different one of the television signals of the EBTV channels, and therefore is a jamming signal;

(g) mixing the local fixed frequency with the pfx, thereby creating a jamming signal ("pfxj"); and (h) combining pfxj with the TOTAL CHANNELS' TV signals that are going to the subscriber, when pfxj is for one of the channels that the subscriber status information indicates that subscriber is not entitled to receive.

3. A method for selectively controlling subscriber access to the television channels in a CATV system, that transmits, from its head end, multiple channels' TV signals that every subscriber has access to (the "BTV channels") and multiple channels' TV signals that every subscriber may not have access to (the "EBTV channels"), wherein the BTV channels and the EBTV channels are together referred to as the "TOTAL CHANNELS", wherein the TOTAL CHANNELS' TV signals are transmitted from the head end on a system carrier wave, and wherein each subscriber receives access to some or all of the TOTAL CHANNELS through a receiver end, and wherein the CATV system, from its head end, is also transmitting subscriber status signals ("SSS"s) each of which identifies which subscriber's receiver end it is intended for and which of the TOTAL CHANNELS' TV signals that subscriber's receiver end should jam the output of; as claimed in claims 1 or 2, wherein each of the six different predetermined head end frequencies are each generated for a duration of 10 microseconds.

4. A method for selectively controlling subscriber access to the television channels in a CATV system, that transmits, from its head end, multiple channels' TV signals that every subscriber has access to (the "BTV channels") and multiple channels' TV signals that every subscriber may not have access to (the "EBTV channels"), wherein the BTV channels and the EBTV channels are together referred to as the "TOTAL CHANNELS", wherein the TOTAL CHANNELS' TV signals are transmitted from the head end on a system carrier wave, and wherein each subscriber receives access to some or all of the TOTAL CHANNELS through a receiver end, and wherein the CATV system, from its head end, is also transmitting subscriber status signals ("SSS"s), each of which identifies which subscriber's receiver end it is intended for and which of the TOTAL CHANNELS' TV signals that subscriber's receiver end should jam the output of to the subscriber claimed in claims 1 or 2, which, at each receiver end is further comprised of:

(i) generating a second local fixed frequency, the amplitude and frequency of which are fixed and stable, which, each time it is combined with a different one of the six different head end generated pfxs will result in a new frequency that is suitable for jamming a different one of the television signals of the EBTV channels, and is a different frequency than any of the pfxjs that would be created when the first local fixed frequency is combined with any of the different ones of the six different head end generated pfxs, and therefore is a different jamming signal hereinafter referred to in general as "pfxj2";

(j) mixing the second local fixed frequency with the pfx, thereby creating jamming signal pfxj2; and (k) combining pfxj2 with the TOTAL CHANNELS' TV signals that are going to the subscriber, when pfxj2 is for one of the channels that the subscriber status information indicates that subscriber is not entitled to receive.

5. A method for selectively controlling subscriber access to the television channels in a CATV system, that transmits, from its head end, multiple channels' TV signals that every subscriber has access to (the "BTV channels") and multiple channels' TV signals that every subscriber may not have access to (the "EBTV channels"), wherein the BTV channels and the EBTV channels are together referred to as the "TOTAL CHANNELS", wherein the TOTAL CHANNELS' TV signals are transmitted from the head end on a system carrier wave, and wherein each subscriber, receives access to some or all of the TOTAL CHANNELS through a receiver end, and wherein the CATV system, from its head end, is also transmitting subscriber status signals ("SSS"s), each of which identifies which subscriber's receiver end it is intended for and which of the TOTAL CHANNELS' TV signals that subscriber's receiver end should jam the output of; as claimed in claims 1 or 2, which, at each receiver end is further comprised of:

(i) generating a second local fixed frequency, the amplitude and frequency of which are fixed and stable, which, each time it is combined with a different one of the six different head end generated pfxs will result in a new frequency that is suitable for jamming a different one of the television signals of the EBTV channels, and is a different frequency than any of the pfxjs that would be created when the first local fixed frequency is combined with any of the different ones of the six different head end generated pfxs, and therefore is a different jamming signal, hereinafter referred to in general as "pfxj2";

(j) mixing the second local fixed frequency with the pfx, thereby creating jamming signal pfxj2; (k) combining pfxj2 with the TOTAL CHANNELS' TV signals that are going to the subscriber, when pfxj2 is for one of the channels that the subscriber status information indicates that subscriber is not entitled to receive; and (l) wherein each of the six different predetermined head end frequencies are each generated for a duration of 10 microseconds.

6. A method for selectively controlling subscriber access to the television channels in a CATV system, that transmits, from its head end, multiple channels' TV signals that every subscriber has access to (the "BTV channels") and multiple channels' TV signals that every subscriber may not have access to (the "EBTV channels"), wherein the BTV channels and the EBTV channels are together referred to as the "TOTAL CHANNELS", wherein the TOTAL CHANNELS' TV signals are transmitted from the head end on a system carrier wave, and wherein each subscriber receives access to some or all of the TOTAL CHANNELS through a receiver end, and wherein the CATV system, from its head end, is also transmitting subscriber status signals ("SSS"s), each of which identifies which subscriber's receiver end it is intended for and which of the TOTAL CHANNELS' TV signals that subscriber's receiver end should jam the output of; as claimed in claims 1 or 2, which, at each receiver end is further comprised of:

(i) generating a second local fixed frequency, the amplitude and frequency of which are fixed and stable, which, each time it is combined with a different one of the six different head end generated pfxs will result in a new frequency that is suitable for jamming a different one of the television signals of the EBTV channels, and is a different frequency than any of the pfxjs that would be created when the first local fixed frequency is combined with any of the different ones of the six different head end generated pfxs, and therefore is a different jamming signal, hereinafter referred to in general as "pfxj2";

(j) mixing the second local fixed frequency with the pfx, thereby creating jamming signal pfxj2;

(k) combining pfxj2 with the TOTAL CHANNELS' TV signals that are going to the subscriber, when pfxj2 is for one of the channels that the subscriber status information indicates that subscriber is not entitled to receive;

(l) generating a third local fixed frequency, the amplitude and frequency of which are fixed and stable, which, each time it is combined with a different one of the six different head end generated pfxs will result in a new frequency that is suitable for jamming a different one of the television signals of the EBTV channels, and is a different frequency than any of the pfxjs that would be created when the first local fixed frequency or the second local fixed frequency is combined with any of the different ones of the six different head end generated pfxs, and therefore is a different jamming signal, hereinafter referred to in general as "pfxj3";

(m) mixing the third local fixed frequency with the pfx, thereby creating jamming signal pfxj3; and (n) combining pfxj3 with the TOTAL CHANNELS' TV signals that are going to the subscriber, when pfxj3 is for one of the channels that the subscriber status information indicates that subscriber is not entitled to receive.

7. A method for selectively controlling subscriber access to the television channels in a CATV system, that transmits, from its head end, multiple channels' TV signals that every subscriber has access to (the "BTV channels") and multiple channels' TV signals that every subscriber may not have access to (the "EBTV channels"), wherein the BTV channels and the EBTV channels are together referred to as the "TOTAL CHANNELS", wherein the TOTAL CHANNELS' TV signals are transmitted from the head end on a system carrier wave, and wherein each subscriber receives access to some or all of the TOTAL CHANNELS through a receiver end, and wherein the CATV system, from its head end, is also transmitting subscriber status signals ("SSS"s), each of which identifies which subscriber's receiver end it is intended for and which of the TOTAL CHANNELS' TV signals that subscriber's receiver end should jam the output of; as claimed in claims 1 or 2, which, at each receiver end is further comprised of:
  (i) generating a second local fixed frequency, the amplitude and frequency of which are fixed and stable, which, each time it is combined with a different one of the six different head end generated pfxs will result in a new frequency that is suitable for jamming a different one of the television signals of the EBTV channels, and is a different frequency than any of the pfxjs that would be created when the first local fixed frequency is combined with any of the different ones of the six different head end generated pfxs, and therefore is a different jamming signal, hereinafter referred to in general as "pfxj2";
  (j) mixing the second local fixed frequency with the pfx, thereby creating jamming signal pfxj2;
  (k) combining pfxj2 with the TOTAL CHANNELS' TV signals that are going to the subscriber, when pfxj2 is for one of the channels that the subscriber status information indicates that subscriber is not entitled to receive;
  (l) generating a third local fixed frequency, the amplitude and frequency of which are fixed and stable, which, each time it is combined with a different one of the six different head end generated pfxs will result in a new frequency that is suitable for jamming a different one of the television signals of the EBTV channels, and is a different frequency than any of the pfxjs that would be created when the first local fixed frequency or the second local fixed frequency is combined with any of the different ones of the six different head end generated pfxs, and therefore is a different jamming signal, hereinafter referred to in general as "pfxj3";
  (m) mixing the third local fixed frequency with the pfx, thereby creating jamming signal pfxj3;
  (n) combining pfxj3 with the TOTAL CHANNELS' TV signals that are going to the subscriber, when pfxj3 is for one of the channels that the subscriber status information indicates that subscriber is not entitled to receive; and
  (o) wherein each of the six different predetermined head end frequencies are each generated for a duration of 10 microseconds.

8. A method for selectively controlling subscriber access to the television channels in a CATV system, that transmits, from its head end, multiple channels' TV signals that every subscriber has access to (the "BTV channels") and multiple channels' TV signals that every subscriber may not have access to (the "EBTV channels"), wherein the BTV channels and the EBTV channels are together referred to as the "TOTAL CHANNELS", wherein the TOTAL CHANNELS' TV signals are transmitted from the head end on a system carrier wave, and wherein each subscriber receives access to some or all of the TOTAL CHANNELS through a receiver end, and wherein the CATV system, from its head end, is also transmitting subscriber status signals ("SSS"s), each of which identifies which subscriber's receiver end it is intended for and which of the TOTAL CHANNELS' TV signals that subscriber's receiver end should jam the output of; as claimed in claims 1 or 2, which, at each receiver end is further comprised of:
  (i) generating a second local fixed frequency, the amplitude and frequency of which are fixed and stable, which, each time it is combined with a different one of the six different head end generated pfxs will result in a new frequency that is suitable for jamming a different one of the television signals of the EBTV channels, and is a different frequency than any of the pfxjs that would be created when the first local fixed frequency is combined with any of the different ones of the six different head end generated pfxs, and therefore is a different jamming signal, hereinafter referred to in general as "pfxj2";
  (j) mixing the second local fixed frequency with the pfx, thereby creating jamming signal pfxj2;
  (k) combining pfxj2 with the TOTAL CHANNELS' TV signals that are going to the subscriber, when pfxj2 is for one of the channels that the subscriber status information indicates that subscriber is not entitled to receive;
  (l) generating a third local fixed frequency, the amplitude and frequency of which are fixed and stable, which, each time it is combined with a different one of the six different head end generated pfxs will result in a new frequency that is suitable for jamming a different one of the television signals of the EBTV channels, and is a different frequency than any of the pfxjs that would be created when the first local fixed frequency or the second local fixed frequency is combined with any of the different ones of the six different head end generated pfxs, and therefore is a different jamming signal, hereinafter referred to in general as "pfxj3";
  (m) mixing the third local fixed frequency with the pfx, thereby creating jamming signal pfxj3;
  (n) combining pfxj3 with the TOTAL CHANNELS' TV signals that are going to the subscriber, when pfxj3 is for one of the channels that the subscriber status information indicates that subscriber is not entitled to receive;
  (o) generating a forth local fixed frequency, the amplitude and frequency of which are fixed and stable, which, each time it is combined with a different one of the six different head end generated pfxs will result in a new frequency that is suitable for jamming a different one of the television signals of the EBTV channels, and is a different frequency than any of the pfxjs that would be created when the first local fixed frequency or the second local fixed frequency, or the third local fixed frequency is combined with any of the different ones of the six different head end generated pfxs, and therefore is a different jamming signal, hereinafter referred to in general as "pfxj4";

(p) mixing the forth local fixed frequency with the pfx, thereby creating jamming signal pfxj4; and (q) combining pfxj4 with the TOTAL CHANNELS' TV signals that are going to the subscriber, when the pfxj4 is for one of the channels that the subscriber status information indicates that subscriber is not entitled to receive.

9. A method for selectively controlling subscriber access to the television channels in a CATV system, that transmits, from its head end, multiple channels' signals that every subscriber has access to (the "BTV channels") and multiple channels' TV signals that every subscriber may not have access to (the "EBTV channels"), wherein the BTV channels and the EBTV channels are together referred to as the "TOTAL CHANNELS", wherein the TOTAL CHANNELS' TV signals are transmitted from the head end on a system carrier wave, and wherein each subscriber receives access to some or all of the TOTAL CHANNELS through a receiver end, and wherein the CATV system, from its head end, is also transmitting subscriber status signals ("SSS"s), each of which identifies which subscriber's receiver end it is intended for and which of the TOTAL CHANNELS' TV signals that subscriber's receiver end should jam the output of; as claimed in claims 1 or 2, which, at each receiver end is further comprised of:

(i) generating a second local fixed frequency, the amplitude and frequency of which are fixed and stable, which, each time it is combined with a different one of the six different head end generated pfxs will result in a new frequency that is suitable for jamming a different one of the television signals of the EBTV channels, and is a different frequency than any of the pfxjs that would be created when the first local fixed frequency is combined with any of the different ones of the six different head end generated pfxs, and therefore is a different jamming signal, hereinafter referred to in general as "pfxj2";

(j) mixing the second local fixed frequency with the pfx, thereby creating jamming signal pfxj2;

(k) combining pfxj2 with the TOTAL CHANNELS' TV signals that are going to the subscriber, when pfxj2 is for one of the channels that the subscriber status information indicates that subscriber is not entitled to receive;

(l) generating a third local fixed frequency, the amplitude and frequency of which are fixed and stable, which, each time it is combined with a different one of the six different head end generated pfxs will result in a new frequency that is suitable for jamming a different one of the television signals of the EBTV channels, and is a different frequency than any of the pfxjs that would be created when the first local fixed frequency or the second local fixed frequency is combined with any of the different ones of the six different head end generated pfxs, and therefore is a different jamming signal, hereinafter referred to in general as "pfxj3";

(m) mixing the third local fixed frequency with the pfx, thereby creating jamming signal pfxj3;

(n) combining pfxj3 with the TOTAL CHANNELS' TV signals that are going to the subscriber, when pfxj3 is for one of the channels that the subscriber status information indicates that subscriber is not entitled to receive;

(o) generating a forth local fixed frequency, the amplitude and frequency of which are fixed and stable, which, each time it is combined with a different one of the six different head end generated pfxs will result in a new frequency that is suitable for jamming a different one of the television signals of the EBTV channels, and is a different frequency than any of the pfxjs that would be created when the first local fixed frequency or the second local fixed frequency, or the third local fixed frequency is combined with any of the different ones of the six different head end generated pfxs, and therefore is a different jamming signal, hereinafter referred to in general as "pfxj4";

(p) mixing the forth local fixed frequency with the pfx, thereby creating jamming signal pfxj4;

(q) combining pfxj4 with the TOTAL CHANNELS' TV signals that are going to the subscriber, when the pfxj4 is for one of the channels that the subscriber status information indicates that subscriber is not entitled to receive; and (r) wherein each of the six different predetermined head end frequencies are each generated for a duration of 10 microseconds.

10. An apparatus for selectively controlling subscriber access to the television channels in a CATV system, that transmits, from its head end, multiple channels' TV signals that every subscriber has access to (the "BTV channels") and multiple channels' TV signals that every subscriber may not have access to (the "EBTV channels"), wherein the BTV channels and the EBTV channels are together referred to as the "TOTAL CHANNELS", wherein the TOTAL CHANNELS' TV signals are transmitted from the head end on a system carrier wave, and wherein each subscriber receives access to some or all of the TOTAL CHANNELS through a receiver end, and wherein the CATV system, from its head end, is also transmitting subscriber status signals ("SSS"s), each of which identifies which subscriber's receiver end it is intended for and which of the TOTAL CHANNELS' TV signals that subscriber's receiver end should jam the output of; comprised of:

(i) a head-end; and (ii) a multiple of receiver ends;

(iii) wherein the head end is comprised of:

(a) multiple frequency generating means ("MFGM"), that generates, one at a time, six different predetermined frequencies (each of which are hereinafter referred to in general as "fx");

(b) a timing controller ("TC"), that controls the MFGM, and additionally generates a synchronization signal ("sync. sig.") that identifies which fx is being generated; and (iv) wherein the multiple receiver ends are each comprised of:

(c) an input diplexer that receives the TOTAL CHANNELS' TV signals, the SSS, the fx, and the sync. sig., and which outputs the TOTAL CHANNELS' TV signals, the SSS, and the sync. sig., at a first output, and which outputs the fx at a second output;

(d) a first directional coupler, that receives the signals from the first output of the input diplexer;

(e) an isolation amplifier, that receives the signals from the first directional coupler;

(f) a data receiver, that also receives the signals from the first directional coupler, and extracts the SSS and the sync. sig.;

(g) a first RF switch, that receives the signals from the output of the isolation amplifier, and which either transmits or prevents the transmission of the signals to the subscriber;

(h) a local oscillator, that generates a predetermined local fixed frequency the amplitude and frequency of which are fixed and stable, which, each time it is combined with a different one of the six different fxs will result in a new frequency that is suitable for jamming a different one of the television signals of the EBTV channels, and therefore is a jamming signal, hereinafter called "fxj";

(i) a mixer, that receives the predetermined local fixed frequency, and receives the fx outputted at the second output of the input diplexer, and mixes them, thereby creating jamming signal fxj;

(j) an amplifier suitable for raising the level of fxj in order to achieve effective jamming;

(k) a second RF switch, that receives the fxj, and when closed, transmits it to the amplifier, and when open, prevents the transmission of the fxj to the amplifier;

(l) a second directional coupler, that couples the output of the amplifier with the output of the isolation amplifier at an intermediate point between the isolation amplifier and the first RF switch;

(m) a microprocessor, that receives the extracted SSS from the data receiver, decodes the SSS to determine whether or not the subscriber is authorized to receive at least some of the TOTAL CHANNELS, and which, if any, of the EBTV channels the subscriber is authorized to receive, and if the subscriber is not authorized to receive any of the TOTAL CHANNELS, prevents the first RF switch from closing, and if the subscriber is authorized to receive at least some of the TOTAL CHANNELS, prevents the first RF switch from opening;

(n) a synchronization controller, that receives the sync. sig. from the data receiver, and receives the extracted SSS from the microprocessor, and decodes the sync. sig., and decodes the SSS, and causes the second RF switch to close whenever the fxj is jamming an EBTV channel that the subscriber is not authorized to receive, thereby transmitting the fxj to the amplifier and to the subscriber for TV channels which the subscriber is not authorized to receive.

11. An apparatus for selectively controlling subscriber access to the television channels in a CATV system, that transmits, from its head end, multiple channels' TV signals that every subscriber has access to (the "BTV channels") and multiple channels' TV signals that every subscriber may not have access to (the "EBTV channels"), wherein the BTV channels and the EBTV channels are together referred to as the "TOTAL CHANNELS", wherein the TOTAL CHANNELS' TV signals are transmitted from the head end on a system carrier wave, and wherein each subscriber receives access to some or all of the TOTAL CHANNELS through a receiver end, and wherein the CATV system, from its head end, is also transmitting subscriber status signals ("SSS"s), each of which identifies which subscriber's receiver end it is intended for and which of the TOTAL CHANNELS' TV signals that subscriber's receiver end should jam the output of; as claimed in claim 10, wherein each receiver end is also comprised of:

(o) a second local oscillator, that generates a second predetermined local fixed frequency, the amplitude and frequency of which are fixed and stable, which, each time it is combined with a different one of the six different head end generated fxs will result in a new frequency that is suitable for jamming a different one of the television signals of the EBTV channels, and is a different frequency than any of the fxjs that would be created when the first local fixed frequency is combined with any of the different ones of the six different head end generated fxs, and therefore is a different jamming signal, hereinafter referred to in general as "fxj2";

(p) a second mixer;

(q) a splitter, that receives the fx from the second output of the input diplexer, and sends it to each of the first and second mixers;

(r) wherein the second mixer receives the fx from the splitter, and receives the second predetermined local fixed frequency, and mixes them, thereby creating a second jamming signal fxj2;

(s) a third RF switch, that receives the fxj2 from the second mixer;

(t) a second amplifier suitable for raising the level of fxj2 in order to achieve effective jamming;

(u) wherein the third RF switch either transmits or prevents the transmission of fxj2 to the second amplifier;

(v) a combiner, that receives the fxj when it is outputted from the first amplifier, and receives the fxj2 when it is outputted from the second amplifier, and sends them to the second directional coupler;

(w) a filter intermediate between the first RF switch and the subscriber output, that filters out the EBTV channels;

(x) a fourth RF switch, intermediate between the second directional coupler and the subscriber output, that can output to the subscriber the TOTAL CHANNELS' TV signals;

(y) a microprocessor, that receives the extracted SSS from the data receiver, decodes the SSS to determine whether or not the subscriber is authorized to receive at least some of the TOTAL CHANNELS, and which, if any, of the EBTV channels the subscriber is authorized to receive, and if the subscriber is not authorized to receive any of the TOTAL CHANNELS prevents the first RF switch, and the fourth RF switch from closing, and if the subscriber is only authorized to receive the BTV channels closes the first RF switch and causes the fourth RF switch to remain open, and if the subscriber is authorized to receive the BTV channels and at least some of the EBTV channels causes the fourth RF switch to remain closed; and (z) a synchronization controller, that receives the sync. sig. from the data receiver, and the extracted SSS from the microprocessor, and decodes the sync. sig., and decodes the SSS, and causes the second RF switch to close whenever the fxj is jamming an EBTV channel that the subscriber is not authorized to receive, and causes the third RF switch to close whenever the fxj2 is jamming an EBTV channel that the subscriber is not authorized to receive, thereby transmitting the fxj and the fxj2 to their respective amplifiers and to the subscriber for EBTV channels which the subscriber is not authorized to receive.

12. An apparatus for selectively controlling subscriber access to the television channels in a CATV system, that transmits, from its head end, multiple channels' TV signals that every subscriber has access to (the "BTV channels") and multiple channels' TV signals that every subscriber may not have access to (the "EBTV channels"), wherein the BTV channels and the EBTV channels are together referred to as the "TOTAL CHANNELS", wherein the TOTAL CHANNELS' TV signals are transmitted from the head end on a system carrier wave, and wherein each subscriber receives access to some or all of the TOTAL CHANNELS through a receiver end, and wherein the CATV system, from its head end, is also transmitting subscriber status signals ("SSS"s), each of which identifies which subscriber's receiver end it is intended for and which of the TOTAL CHANNELS' TV signals that subscriber's receiver end should jam the output of; as claimed in claim 10, wherein each receiver end is also comprised of:

(o) a second local oscillator, that generates a second predetermined local fixed frequency, the amplitude and frequency of which are fixed and stable, which, each time it is combined with a different one of the six different head end generated fxs will result in a new frequency that is suitable for jamming a different one of the television signals of the EBTV channels, and is a different frequency than any of the fxjs that would be created when the first local fixed frequency is combined with any of the different ones of the six different head end generated fxs, and therefore is a different jamming signal, hereinafter referred to in general as "fxj2";

(p) a second mixer;

(q) a splitter, that receives the fx from the second output of the input diplexer, and sends it to each of the first and second mixers;

(r) wherein the second mixer receives the fx from the splitter, and receives the second predetermined local fixed frequency, and mixes them, thereby creating a second jamming signal fxj2;

(s) a third RF switch, that receives the fxj2 from the second mixer;

(t) a second amplifier suitable for raising the level of fxj2 in order to achieve effective jamming;

(u) wherein the third RF switch either transmits or prevents the transmission of fxj2 to the second amplifier;

(v) a third local oscillator, that generates a third predetermined local fixed frequency, the amplitude and frequency of which are fixed and stable, which, each time it is combined with a different one of the six different head end generated fxs will result in a new frequency that is suitable for jamming a different one of the television signals of the EBTV channels, and is a different frequency than any of the fxjs that would be created when the first local fixed frequency or the second local fixed frequency is combined with any of the different ones of the six different head end generated fxs, and therefore is a different jamming signal, hereinafter referred to in general as "fxj3";

(w) a third mixer;

(x) wherein the splitter that receives the fx from the second output of the input diplexer, and sends it to each of the first and second mixers, also sends it to the third mixer;

(y) wherein the third mixer receives the fx from the splitter and receives the third predetermined local fixed frequency and mixes them, thereby creating a third jamming signal fxj3;

(z) a fourth RF switch that receives the fxj3 from the third mixer;

(aa) a third amplifier suitable for raising the level of fxj3 in order to achieve effective jamming;

(bb) wherein the fourth RF switch either transmits or prevents the transmission of fxj3 to the third amplifier;

(cc) a combiner that receives the fxj when it is outputted from the first amplifier and receives the fxj2 when it is outputted from the second amplifier and receives the fxj3 when it is outputted from the third amplifier and sends them to the second directional coupler;

(dd) a filter intermediate between the first RF switch and the subscriber output that filters out the EBTV channels;

(ee) a fifth RF switch, intermediate between the second directional coupler and the subscriber output, that can output to the subscriber the TOTAL CHANNELS' TV signals;

(ff) a microprocessor that receives the extracted SSS from the data receiver, decodes the SSS to determine whether or not the subscriber is authorized to receive at least some of the TOTAL CHANNELS, and which, if any, of the EBTV channels the subscriber is authorized to receive, and if the subscriber is not authorized to receive any of the TOTAL CHANNELS prevents the first RF switch and the fifth RF switch from closing, and if the subscriber is only authorized to receive the BTV channels closes the first RF switch and causes the fifth RF switch to remain open, and if the subscriber is authorized to receive the BTV channels and at least some of the EBTV channels, causes the fifth RF switch to remain closed; and (gg) a synchronization controller that receives the sync. sig. from the data receiver and the extracted SSS from the microprocessor and decodes the sync. sig. and decodes the SSS and causes the second RF switch to close whenever the fxj is jamming an EBTV channel that the subscriber is not authorized to receive, and causes the third RF switch to close whenever the fxj2 is jamming an EBTV channel that the subscriber is not authorized to receive, and causes the fourth RF switch to close whenever the fxj3 is jamming an EBTV channel that the subscriber is not authorized to receive, thereby transmitting, the fxj, the fxj2, and the fxj3, to their respective amplifiers, and to the subscriber, for EBTV channels which the subscriber is not authorized to receive.

13. An apparatus for selectively controlling subscriber access to the television channels in a CATV system, that transmits, from its head end, multiple channels' TV signals that every subscriber has access to (the "BTV channels") and multiple channels' TV signals that every subscriber may not have access to (the "EBTV channels"), wherein the BTV channels and the EBTV channels are together referred to as the "TOTAL CHANNELS", wherein the TOTAL CHANNELS' TV signals are transmitted from the head end on a system carrier wave, and wherein each subscriber receives access to some or all of the TOTAL CHANNELS through a receiver end, and wherein the CATV system, from its head end, is also transmitting subscriber status signals ("SSS"s), each of which identifies which subscriber's receiver end it is intended for and which of the TOTAL CHANNELS' TV signals that subscriber's receiver end should jam the output of; as claimed in claim 10, wherein each receiver end is also comprised of:

(o) a second local oscillator, that generates a second predetermined local fixed frequency, the amplitude and frequency of which are fixed and stable, which, each time it is combined with a different one of the six different head end generated fxs will result in a new frequency that is suitable for jamming a different one of the television signals of the EBTV channels, and is a different frequency than any of the fxjs that would be created when the first local fixed frequency is combined with any of the different ones of the six different head end generated fxs, and therefore is a different jamming signal, hereinafter referred to in general as "fxj2";

(p) a second mixer;

(q) a splitter, that receives the fx from the second output of the input diplexer, and sends it to each of the first and second mixers;

(r) wherein the second mixer receives the fx from the splitter, and receives the second predetermined local fixed frequency, and mixes them, thereby creating a second jamming signal fxj2;

(s) a third RF switch that receives the fxj2 from the second mixer;

(t) a second amplifier suitable for raising the level of fxj2 in order to achieve effective jamming;

(u) wherein the third RF switch either transmits or prevents the transmission of fxj2 to the second amplifier;

(v) a third local oscillator, that generates a third predetermined local fixed frequency, the amplitude and frequency of which are fixed and stable, which, each time it is combined with a different one of the six different head end generated fxs will result in a new frequency that is suitable for jamming a different one of the television signals of the EBTV channels, and is a different frequency than any of the fxjs that would be created when the first local fixed frequency or the second local fixed frequency is combined with any of the different ones of the six different head end generated fxs, and therefore is a different jamming signal, hereinafter referred to in general as "fxj3";

(w) a third mixer;

(x) wherein the splitter that receives the fx from the second output of the input diplexer and sends it to each of the first and second mixers also sends it to the third mixer;

(y) wherein the third mixer receives the fx from the splitter, and receives the third predetermined local fixed frequency, and mixes them, thereby creating a third jamming signal fxj3;

(z) a fourth RF switch that receives the fxj3 from the third mixer;

(aa) a third amplifier suitable for raising the level of fxj3 in order to achieve effective jamming;

(bb) wherein the fourth RF switch either transmits or prevents the transmission of fxj3 to the third amplifier;

(cc) a fourth local oscillator, that generates a fourth predetermined local fixed frequency, the amplitude and frequency of which are fixed and stable, which, each time it is combined with a different one of the six different head end generated fxs will result in a new frequency that is suitable for jamming a different one of the television signals of the EBTV channels, and is a different frequency than any of the fxjs that would be created when the first local fixed frequency or the second local fixed frequency or the third local fixed frequency is combined with any of the different ones of the six different head end generated fxs, and therefore is a different jamming signal, hereinafter referred to in general as "fxj4";

(dd) a fourth mixer;

(ee) wherein the splitter also sends the fx to the fourth mixer;

(ff) wherein the fourth mixer receives the fx from the splitter and receives the fourth predetermined local fixed frequency and mixes them thereby creating a fourth jamming signal fxj4;

(gg) a fifth RF switch that receives the fxj4 from the fourth mixer;

(hh) a fourth amplifier suitable for raising the level of fxj4 in order to achieve effective jamming;

(ii) wherein the fifth RF switch either transmits or prevents the transmission of fxj4 to the fourth amplifier;

(jj) a combiner, that receives the fxj when it is outputted from the first amplifier, and receives the fxj2 when it is outputted from the second amplifier, and receives the fxj3 when it is outputted from the third amplifier, and receives the fxj4 when it is outputted from the fourth amplifier, and sends them to the second directional coupler;

(kk) a filter intermediate between the first RF switch and the subscriber output that filters out the EBTV channels;

(ll) a sixth RF switch intermediate between the second directional coupler and the subscriber output which can output to the subscriber the TOTAL CHANNELS' TV signals;

(mm) a microprocessor that receives the extracted SSS from the data receiver, decodes the SSS to determine whether or not the subscriber is authorized to receive at least some of the TOTAL CHANNELS, and which, if any, of the EBTV channels the subscriber is authorized to receive, and if the subscriber is not authorized to receive any of the TOTAL CHANNELS prevents the first RF switch and the sixth RF switch from closing, and if the subscriber is only authorized to receive the BTV channels closes the first RF switch and causes the sixth RF switch to remain open, and if the subscriber is authorized to receive the BTV channels and at least some of the EBTV channels causes the sixth RF switch to remain closed; and (nn) a synchronization controller that receives the sync. sig. from the data receiver and the extracted SSS from the microprocessor, and decodes the sync. sig., and decodes the SSS, and causes the second RF switch to close whenever the fxj is jamming an EBTV channel that the subscriber is not authorized to receive, and causes the third RF switch to close whenever the fxj2 is jamming an EBTV channel that the subscriber is not authorized to receive, and causes the fourth RF switch to close whenever the fxj3 is jamming an EBTV channel that the subscriber is not authorized to receive, and causes the fifth RF switch to close whenever the fxj4 is jamming an EBTV channel that the subscriber is not authorized to receive, thereby transmitting, the fxj, the fxj2, the fxj3, and the fxj4, to their respective amplifiers, and to the subscriber, for EBTV channels which the subscriber is not authorized to receive.

14. An apparatus for selectively controlling subscriber access to the television channels in a CATV system, that transmits, from its head end, multiple channels' TV signals that every subscriber has access to (the "BTV channels") and multiple channels' TV signals that every subscriber may not have access to (the "EBTV channels"), wherein the BTV channels and the EBTV channels are together referred to as the "TOTAL CHANNELS", wherein the TOTAL CHANNELS' TV signals are transmitted from the head end on a system carrier wave, and wherein each subscriber receives access to some or all of the TOTAL CHANNELS through a receiver end, and wherein the CATV system, from its head end, is also transmitting subscriber status signals ("SSS"s), each of which identifies which subscriber's receiver end it is intended for and which of the TOTAL CHANNELS' TV signals that subscriber's receiver end should jam the output of; as claimed in claim 10: wherein the multiple frequency generating means of the head end is comprised up of:

(o) a master IF oscillator that generates a signal of a predetermined frequency that is stable in both amplitude and frequency;

(p) a master RF switch ("MRF") that receives the signal from the master IF oscillator;

(q) a bandpass filter that receives the signal from the MRF, and which further reduces the harmonics that caused by the switching of the master IF oscillator;

(r) six frequency agile modulators;

(s) six RF switches, each of which is coupled at one end to a unique one of the six frequency agile modulators;

(t) a splitter, that divides the outputted signal from the bandpass filter six ways, one to each of the six RF switches;

(u) a combiner, that merges the outputs of the six frequency agile modulators into one main output, which is to be combined with the TOTAL CHANNELS' TV signals;

(v) a timing controller ("TC"), that puts out a sync. sig., and closes and opens the MRF for a predetermined duration at fixed intervals, and sequentially closes and opens, and continues to sequentially close and open each of the six RF switches, beginning with the first one, for approximately the same predetermined duration, at the same fixed intervals as it closes and opens the MRF, to enable the six frequency agile modulators to sequentially receive the signal bursts through the bandpass filter; and (w) wherein the six frequency agile modulators output six different predetermined frequencies, each of which frequencies is stable in both amplitude and frequency, and each of which lasts for a predetermined duration, and wherein the sync. sig. identifies which of the six different predetermined frequencies is being generated.

15. An apparatus for selectively controlling subscriber access to the television channels in a CATV system, that transmits, from its head end, multiple channels' TV signals that every subscriber has access to (the "BTV channels") and multiple channels' TV signals that every subscriber may not have access to (the "EBTV channels"), wherein the BTV channels and the EBTV channels are together referred to as the "TOTAL CHANNELS", wherein the TOTAL CHANNELS' TV signals are transmitted from the head end on a system carrier wave, and wherein each subscriber receives access to some or all the TOTAL CHANNELS through a receiver end, and wherein the CATV system, from its head end, is also transmitting subscriber status signals ("SSS"s), each of which identifies which subscriber's receiver end it is intended for and which of the TOTAL CHANNELS' TV signals that subscriber's receiver end should jam the output of; as claimed in claim 10: wherein the multiple frequency generating means of the head end is comprised up of:

(o) a master IF oscillator, that generates a signal of a predetermined frequency that is stable in both amplitude and frequency;

(p) a master RF switch ("MRF") that receives the signal from the master IF oscillator;

(q) a bandpass filter that receives the signal from the MRF, and which further reduces the harmonics that caused by the switching of the master IF oscillator;

(r) six frequency agile modulators;

(s) six RF switches, each of which is coupled at one end to a unique one of the six frequency agile modulators;

(t) a splitter that divides the outputted signal from the bandpass filter six ways, one to each of the six RF switches;

(u) a combiner that merges the outputs of the six frequency agile modulators into one main output which is to be combined with the TOTAL CHANNELS' TV signals;

(v) a timing controller ("TC") that puts out a sync. sig., and closes and opens the MRF for a predetermined duration at fixed intervals, and sequentially closes and opens and continues to sequentially close and open each of the six RF switches beginning with the first one, for approximately the same predetermined duration, at the same fixed intervals, as it closes and opens the MRF, to enable the six frequency agile modulators to sequentially receive the signal bursts through the bandpass filter;

(w) wherein the six frequency agile modulators output six different predetermined frequencies, each of which frequencies is stable in both amplitude and frequency, and each of which lasts for a predetermined duration, and wherein the sync. sig. identifies which of the six different predetermined frequencies is being generated;

(x) and wherein the sync. sig. is amplitude modulated onto the system carrier wave;

(y) and wherein the SSS is frequency shift key ("fsk") modulated onto the system carrier wave; and (z) wherein the data receivers of the receiver ends extract the sync. sig. and the SSS form the system carrier wave by demodulating them.

16. An apparatus for selectively controlling subscriber access to the television channels in a CATV system, that transmits, from its head end, multiple channels' TV signals that every subscriber has access to (the "BTV channels") and multiple channels' TV signals that every subscriber may not have access to (the "EBTV channels"), wherein the BTV channels and the EBTV channels are together referred to as the "TOTAL CHANNELS", wherein the TOTAL CHANNELS' TV signals are transmitted from the head end on a system carrier wave, and wherein each subscriber receives access to some or all of the TOTAL CHANNELS through a receiver end, and wherein the CATV system, from its head end, is also transmitting subscriber status signals ("SSS"s), each of which identifies which subscriber's receiver end it is intended for and which of the TOTAL CHANNELS' TV signals that subscriber's receiver end should jam the output of; as claimed in claim 10: wherein the multiple frequency generating means of the head end is comprised up of:

(o) a master IF oscillator, that generates a signal of a predetermined frequency, that is stable in both amplitude and frequency;

(p) a master RF switch ("MRF") that receives the signal from the master IF oscillator;

(q) a bandpass filter that receives the signal from the MRF, and which further reduces the harmonics that caused by the switching of the master IF oscillator;

(r) six frequency agile modulators;

(s) six RF switches, each of which is coupled at one end to a unique one of the six frequency agile modulators;

(t) a splitter that divides the outputted signal from the bandpass filter six ways, one to each of the six RF switches;

(u) a combiner that merges the outputs of the six frequency agile modulators into one main output which is to be combined with the TOTAL CHANNELS' TV signals;

(v) a timing controller ("TC") that puts out a sync. sig., and closes and opens the MRF for a predetermined duration, at fixed intervals, and sequentially closes and opens, and continues to sequentially close and open each of the six RF switches, beginning with the first one, for approximately the same predetermined duration, at the same fixed intervals as it closes and opens the MRF, to enable the six frequency agile modulators to sequentially receive the signal bursts through the bandpass filter;

(w) wherein the six frequency agile modulators output six different predetermined frequencies, each of which frequencies is stable in both amplitude and frequency, and each of which lasts for a predetermined duration, and wherein the sync. sig. identifies which of the six different predetermined frequencies is being generated;

(x) and wherein the sync. sig. is amplitude modulated onto the system carrier wave;

(y) and wherein the SSS is frequency shift key ("fsk") modulated onto the system carrier wave;

(z) wherein the data receivers of the receiver ends extract the sync. sig. and the SSS from the system carrier wave, by demodulating them; and wherein each receiver end, is also comprised of:

(aa) a second local oscillator, that generates a second predetermined local fixed frequency, the amplitude and frequency of which are fixed and stable, which, each time it is combined with a different one of the six different head end generated fxs will result in a new frequency that is suitable for jamming a different one of the television signals of the EBTV channels, and is a different frequency than any of the fxjs that would be created when the first local fixed frequency is combined with any of the different ones of the six different head end generated fxs, and therefore is a different jamming signal, hereinafter referred to in general as "fxj2";

(bb) a second mixer;

(cc) a splitter that receives the fx from the second output of the input diplexer and sends it to each of the first and second mixers;

(dd) wherein the second mixer receives the fx from the splitter and receives the second predetermined local fixed frequency and mixes them, thereby creating a second jamming signal fxj2;

(ee) a third RF switch that receives the fxj2 from the second mixer;

(ff) a second amplifier suitable for raising the level of fxj2 in order to achieve effective jamming;

(gg) wherein the third RF switch either transmits or prevents the transmission of fxj2 to the second amplifier;

(hh) a combiner that receives the fxj when it is outputted from the first amplifier and receives the fxj2 when it is outputted from the second amplifier and sends them to the second directional coupler;

(ii) a filter intermediate between the first RF switch and the subscriber output that filters out the EBTV channels;

(jj) a fourth RF switch intermediate between the second directional coupler and the subscriber output that can output to the subscriber the TOTAL CHANNELS' TV signals;

(kk) a microprocessor that receives the extracted SSS from the data receiver, decodes the SSS to determine whether or not the subscriber is authorized to receive at least some of the TOTAL CHANNELS, and which, if any, of the EBTV channels the subscriber is authorized to receive, and if the subscriber is not authorized to receive any of the TOTAL CHANNELS prevents the first RF switch and the fourth RF switch from closing, and if the subscriber is only authorized to receive the BTV channels closes the first RF switch and causes the fourth RF switch to remain open, and if the subscriber is authorized to receive the BTV channels and at least some of the EBTV channels causes the fourth RF switch to remain closed; and (ll) a synchronization controller that receives the sync. sig. from the data receiver, and the extracted SSS from the microprocessor, and decodes the sync. sig., and decodes the SSS and causes the second RF switch to close whenever the fxj is jamming an EBTV channel that the subscriber is not authorized to receive, and causes the third RF switch to close whenever the fxj2 is jamming an EBTV channel that the subscriber is not authorized to receive, thereby transmitting the fxj and the fxj2 to their respective amplifiers, and to the subscriber, for EBTV channels which the subscriber is not authorized to receive.

17. An apparatus for selectively controlling subscriber access to the television channels in a CATV system, that transmits, from its head end, multiple channels' TV signals that every subscriber has access to (the "BTV channels") and multiple channels' TV signals that every subscriber may not have access to (the "EBTV channels"), wherein the BTV channels and the EBTV channels are together referred to as the "TOTAL CHANNELS", wherein the TOTAL CHANNELS' TV signals are transmitted from the head end on a system carrier wave, and wherein each subscriber receives access to some or all of the TOTAL CHANNELS through a receiver end, and wherein the CATV system, from its head end, is also transmitting subscriber status signals ("SSS"s), each of which identifies which subscriber's receiver end it is intended for and which of the TOTAL CHANNELS' TV signals that subscriber's receiver end should jam the output of; comprised of:

(i) a head-end; and
(ii) a multiple of receiver ends;
(iii) wherein the head end is comprised of:
    (a) multiple frequency generating means ("MFGM"), that generates, one at a time, six different predetermined frequencies (each of which are hereinafter referred to in general as "fx");
    (b) a timing controller ("TC") that controls the MFGM and additionally generates a synchronization signal ("sync. sig.") that identifies which fx is being generated; and
(iv) wherein the multiple receiver ends are each comprised of:
    (c) an input diplexer that receives the TOTAL CHANNELS' TV signals, the SSS, the fx, and the sync. sig., and which outputs the TOTAL CHANNELS' TV signals, the SSS, and the sync. sig., at a first output, and which outputs the fx at a second output;
    (d) a first directional coupler that receives the signals from the first output of the input diplexer;
    (e) a first splitter that receives the signals from the output of the first directional coupler;
    (f) a first isolation amplifier that receives the signal from the first splitter;
    (g) a second isolation amplifier that receives the signal from the first splitter;
    (h) a first RF switch that receives the signals from the output of the first isolation amplifier and which either transmits or prevents the transmission of the signals to the first subscriber;
    (i) a second RF switch that receives the signals from the output of the second isolation amplifier and which either transmits or prevents the transmission of the signals to the second subscriber;
    (j) a data receiver that also receives the signals from the first directional coupler, and extracts the SSS and the sync. sig.;
    (k) a local oscillator, that generates a predetermined local fixed frequency, the amplitude and frequency of which are fixed and stable, which, each time it is combined with a different one of the six different fxs will result in a new frequency that is suitable for jamming a different one of the television signals of the EBTV channels, and therefore is a jamming signal, hereinafter called "fxj";
    (l) a mixer that receives the predetermined local fixed frequency and receives the fx outputted at the second output of the input diplexer, and mixes them, thereby creating jamming signal fxj;
    (m) an amplifier suitable for raising the level of fxj in order to achieve effective jamming;
    (n) a second splitter that receives the raised fxj from the amplifier;
    (o) a third RF switch that receives the fxj from the second splitter, and which either transmits or prevents the transmission of the fxj to the first subscriber;
    (p) a fourth RF switch that receives the fxj from the second splitter, and which either transmits or prevents the transmission of the fxj to the second subscriber;
    (q) a second directional coupler that couples the output of the third RF switch with the output of the first isolation amplifier at an intermediate point between the first isolation amplifier and the first RF switch;
    (r) a third directional coupler that couples the output of the fourth RF switch with the output of the second isolation amplifier at an intermediate point between the second isolation amplifier and the fourth RF switch;
    (s) a microprocessor that receives the extracted SSS from the data receiver, decodes the SSS to determine whether or not a subscriber is authorized to receive at least some of the TOTAL CHANNELS, and which, if any, of the EBTV channels that subscriber is authorized to receive, and if that subscriber is not authorized to receive any of the TOTAL CHANNELS prevents the appropriate one of the first and second RF switches, as the case may be, from closing, and if a subscriber is authorized to receive at least some of the TOTAL CHANNELS prevents the appropriate one of the first and second RF switches from opening; and
    (t) a synchronization controller that receives the sync. sig. from the data receiver and the extracted SSS from the microprocessor, and decodes the sync. sig., and decodes the SSS, and causes the third RF switch to close whenever the fxj is jamming an EBTV channel that the first subscriber is not authorized to receive, and causes the fourth RF switch to close whenever the fxj is jamming an EBTV channel that the second subscriber is not authorized to receive, thereby transmitting the fxj to the amplifier and to the appropriate subscriber for EBTV channels which that subscriber is not authorized to receive.

18. An apparatus for selectively controlling subscriber access to the television channels in a CATV system, that transmits, from its head end, multiple channels' TV signals that every subscriber has access to (the "BTV channels") and multiple channels' TV signals that every subscriber may not have access to (the "EBTV channels"), wherein the BTV channels and the EBTV channels are together referred to as the "TOTAL CHANNELS" wherein the TOTAL CHANNELS' TV signals are transmitted from the head end on a system carrier wave, and wherein each subscriber receives access to some or all of the TOTAL CHANNELS through a receiver end, and wherein the CATV system, from its head end, is also transmitting subscriber status signals ("SSS"s), each of which identifies which subscriber's receiver end it is intended for and which of the TOTAL CHANNELS' TV signals that subscriber's receiver end should jam the output of; as claimed in claim 17, wherein the multiple frequency generating means of the head end is comprised of:

(u) a master IF oscillator that generates a signal of a predetermined frequency that is stable in both amplitude and frequency;

(v) a master RF switch ("MRF") that receives the signal from the master IF oscillator;

(w) a bandpass filter that receives the signal from the MRF and which further reduces the harmonics that caused by the switching of the master IF oscillator;

(x) six frequency agile modulators;

(y) six RF switches, each of which is coupled at one end to a unique one of the six frequency agile modulators;

(z) a splitter that divides the outputted signal from the bandpass filter six ways, one to each of the six RF switches;

(aa) a combiner that merges the outputs of the six frequency agile modulators into one main output, which is to be combined with the TOTAL CHANNELS' TV signals;

(bb) a timing controller ("TC") that puts out a sync. sig., and closes and opens the MRF, for a predetermined duration, at fixed intervals, and sequentially closes and opens, and continues to sequentially close and open each of the six RF switches, beginning with the first one, for approximately the same predetermined duration, at the same fixed intervals as it closes and opens the MRF, to enable the six frequency agile modulators to sequentially receive the signal burst through the bandpass filter; and (cc) wherein the six frequency agile modulators output six different predetermined frequencies, each of which frequencies is stable in both amplitude and frequency, and each of which lasts for a predetermined duration, and wherein the sync. sig. identifies which of the six different predetermined frequencies is being generated.

19. An apparatus for selectively controlling subscriber access to the television channels in a CATV system, that transmits, from its head end, multiple channels' TV signals that every subscriber has access to (the "BTV channels") and multiple channels' TV signals that every subscriber may not have access to (the "EBTV channels"), wherein the BTV channels and the EBTV channels are together referred to as the "TOTAL CHANNELS", wherein the TOTAL CHANNELS' TV signals are transmitted from the head end on a system carrier wave, and wherein each subscriber receives access to some or all of the TOTAL CHANNELS through a receiver end, and wherein the CATV system, from its head end, is also transmitting subscriber status signals ("SSS"s), each of which identifies which subscriber's receiver end it is intended for and which of the TOTAL CHANNELS' TV signals that subscriber's receiver end should jam the output of; comprised of:

(i) a head-end; and (ii) a multiple of receiver ends;

(iii) wherein the head end is comprised of:

(a) multiple frequency generating means ("MFGM"), that generates, one at a time, six different predetermined frequencies (each of which are hereinafter referred to in general as "fx");

(b) a timing controller ("TC") that controls the MFGM and additionally generates a synchronization signal ("sync. sig.") that identifies which fx is being generated; and (iv) wherein the multiple receiver ends are each comprised of:

(c) an input diplexer that receives the TOTAL CHANNELS' TV signals, the SSS, the fx, and the sync. sig., and which outputs the TOTAL CHANNELS' TV signals, the SSS, and the sync. sig., at a first output, and which outputs the fx at a second output;

(d) a first directional coupler that receives the signals from the first output of the input diplexer;

(e) an isolation amplifier that receives the signals from the first directional coupler;

(f) a data receiver that also receives the signals from the first directional coupler and extracts the SSS and the sync. sig.;

(g) a first RF switch that receives the signals from the output of the isolation amplifier, and which either transmits or prevents the transmission of the signals to the subscriber;

(h) a local oscillator, that generates a predetermined local fixed frequency, the amplitude and frequency of which are fixed and stable, which, each time it is combined with a different one of the six different fxs will result in a new frequency that is suitable for jamming a different one of the television signals of the EBTV channels, and therefore is a jamming signal, hereinafter referred to as "fxj";

(i) a mixer that receives the predetermined local fixed frequency and receives the fx outputted at the second output of the input diplexer, and mixes them, thereby creating jamming signal fxj;

(j) a second diplexer that receives the fxj from the mixer, and separates it into its sum signal "fxj+", and its difference signal "fxj−";

(k) a second RF switch that receives fxj+ from the second diplexer;

(l) a third RF switch that receives fxj− from the second diplexer;

(m) an amplifier suitable for raising the level of fxj+ in order to achieve effective jamming;

(n) an amplifier suitable for raising the level of fxj− in order to achieve effective jamming;

(o) a combiner that combines the signals from the two amplifiers;

(p) a second directional coupler that couples the output of the two amplifiers with the output of the isolation amplifier at an intermediate point between the isolation amplifier and the first RF switch;

(q) a microprocessor that receives the extracted SSS from the data receiver, decodes the SSS to determine whether or not the subscriber is authorized to receive at least some of the TOTAL CHANNELS, and which, if any, of the EBTV channels the subscriber is authorized to receive, and if the subscriber is not authorized to receive any of the TOTAL CHANNELS prevents the first RF switch from closing, and if the subscriber is authorized to at least receive the BTV channels prevents the first RF switch from opening; and (r) a synchronization controller that receives the sync. sig. from the data receiver, and the extracted SSS from the microprocessor, and decodes the sync. sig., and decodes the SSS, and causes the second RF switch to close whenever the fxj+ is jamming an EBTV channel that the subscriber is not authorized to receive, and causes the third RF switch to close whenever the fxj- is jamming an EBTV channel that the subscriber is not authorized to receive, thereby transmitting the fxj+ and the fxj-to their respective amplifiers, and to the subscriber, for EBTV channels which the subscriber is not authorized to receive.

20. An apparatus for selectively controlling subscriber access to the television channels in a CATV system, that transmits, from its head end, multiple channels' TV signals that every subscriber has access to (the "BTV channels") and multiple channels' TV signals that every subscriber may not have access to (the "EBTV channels"), wherein the BTV channels and the EBTV channels are together referred to as the "TOTAL CHANNELS", wherein the TOTAL CHANNELS' TV signals are transmitted from the head end on a system carrier wave, and wherein each subscriber receives access to some or all of the TOTAL CHANNELS through a receiver end, and wherein the CATV system, from its head end, is also transmitting subscriber status signals ("SSS"s), each of which identifies which subscriber's receiver end it is intended for and which of the TOTAL CHANNELS' TV signals that subscriber's receiver end should jam the output of; as claimed in claim 19, wherein the multiple frequency generating means of the head end is comprised of:

(s) a master IF oscillator that generates a signal of a predetermined frequency that is stable in both amplitude and frequency;

(t) a master RF switch ("MRF") that receives the signal from the master IF oscillator;

(u) a bandpass filter that receives the signal from the MRF, and which further reduces the harmonics that caused by the switching of the master IF oscillator;

(v) six frequency agile modulators;

(w) six RF switches, each of which is coupled at one end to a unique one of the six frequency agile modulators;

(x) a splitter that divides the outputted signal from the bandpass filter six ways, one to each of the six RF switches;

(y) a combiner that merges the outputs of the six frequency agile modulators into one main output which is to be combined with the TOTAL CHANNELS' TV signals;

(z) a timing controller ("TC") that puts out a sync. sig., and closes and opens the MRF for a predetermined duration, at fixed intervals, and sequentially closes and opens, and continues to sequentially close and open each of the six RF switches, beginning with the first one, for approximately the same predetermined duration, at the same fixed intervals as it closes and opens the MRF, to enable the six frequency agile modulators to sequentially receive the signal bursts through the bandpass filter; and (aa) wherein the six frequency agile modulators output six different predetermined frequencies, each of which frequencies is stable in both amplitude and frequency, and each of which lasts for a predetermined duration, and wherein the sync. sig. identifies which of the six different predetermined frequencies is being generated.

* * * * *

UNITED STATES PATENT AND TRADEMARK OFFICE
CERTIFICATE OF CORRECTION

PATENT NO. : 5,355,410

DATED : October 11, 1994

INVENTOR(S) : Pierre Blais and Michael Rychel

It is certified that error appears in the above-identified patent and that said Letters Patent is hereby corrected as shown below:

On the title page, item [54] and in column 1:
In the title, delete the word "MULTI-TIRE", and substitute therefor --MULTI-TIER --.

In column 7, line 13, after the word "bands", insert -- of --.

In column 8, line 33, delete the word "that", and substitute therefor -- then --.

In column 15, line 16, before the word "claimed", insert -- as --.

In column 19, line 13, the word "signals should read --TV signals--

Signed and Sealed this

Twentieth Day of June, 1995

Attest:

BRUCE LEHMAN

*Attesting Officer*  *Commissioner of Patents and Trademarks*